US011916280B2

(12) United States Patent
Bolz et al.

(10) Patent No.: US 11,916,280 B2
(45) Date of Patent: Feb. 27, 2024

(54) ANTENNA FOR IEEE 802.11 APPLICATIONS, WIRELESS DEVICE, AND WIRELESS COMMUNICATION SYSTEM

(71) Applicant: THE ANTENNA COMPANY INTERNATIONAL N.V., Willemstad (CW)

(72) Inventors: Thomas Bolz, Sonsbeck (DE); Diego Caratelli, Eersel (NL)

(73) Assignee: THE ANTENNA COMPANY INTERNATIONAL N.V., Willemstad (CW)

( * ) Notice: Subject to any disclaimer, the term of this patent is extended or adjusted under 35 U.S.C. 154(b) by 244 days.

(21) Appl. No.: 17/441,684

(22) PCT Filed: Mar. 16, 2020

(86) PCT No.: PCT/NL2020/050174

§ 371 (c)(1),
(2) Date: Sep. 21, 2021

(87) PCT Pub. No.: WO2020/197382

PCT Pub. Date: Oct. 1, 2020

(65) Prior Publication Data

US 2022/0102838 A1 Mar. 31, 2022

(30) Foreign Application Priority Data

Mar. 22, 2019 (NL) ..................................... 2022790

(51) Int. Cl.
*H01Q 1/22* (2006.01)
*H01Q 9/26* (2006.01)
(Continued)

(52) U.S. Cl.
CPC ............. *H01Q 1/2291* (2013.01); *H01Q 9/26* (2013.01); *H01Q 9/285* (2013.01); *H01Q 21/205* (2013.01); *H01Q 21/30* (2013.01)

(58) Field of Classification Search
CPC ........ H01Q 1/2291; H01Q 9/26; H01Q 9/265; H01Q 21/205
USPC ........................................................ 343/799
See application file for complete search history.

(56) References Cited

U.S. PATENT DOCUMENTS

| | | | | |
|---|---|---|---|---|
| 4,434,425 A * | 2/1984 | Barbano | H01Q 19/17 343/797 |
| 2011/0221647 A1* | 9/2011 | Freiert | H01Q 9/26 343/803 |
| 2017/0222321 A1 | 8/2017 | Caratelli et al. | |

FOREIGN PATENT DOCUMENTS

| | | |
|---|---|---|
| CN | 202662775 U | 1/2013 |
| CN | 203013940 U | 6/2013 |

(Continued)

OTHER PUBLICATIONS

Search Report dated Jun. 19, 2020 issued in corresponding International Application No. PCT/NL2020/050174.

(Continued)

*Primary Examiner* — Peguy Jean Pierre
(74) *Attorney, Agent, or Firm* — Nath, Goldberg & Meyer; Joshua B. Goldberg

(57) ABSTRACT

The invention relates to an antenna, in particular suitable for IEEE 802.11 applications. The invention also relates to a wireless device, such as a wireless access point (AP), a router, a gateway, and/or a bridge, comprising at least one antenna according to the invention. The invention further relates to a wireless communication system, comprising a
(Continued)

plurality of antennas according to the invention, and, preferably, a plurality of wireless devices according to the invention.

20 Claims, 26 Drawing Sheets

(51) Int. Cl.

| | |
|---|---|
| ***H01Q 9/28*** | (2006.01) |
| ***H01Q 21/20*** | (2006.01) |
| ***H01Q 21/30*** | (2006.01) |

(56) References Cited

FOREIGN PATENT DOCUMENTS

| | | |
|---|---|---|
| CN | 103811861 A | 5/2014 |
| CN | 104103900 B | 8/2016 |
| CN | 108039578 A | 5/2018 |
| CN | 207474675 U | 6/2018 |

OTHER PUBLICATIONS

Written Opinion dated Jun. 19, 2020 issued in corresponding International Application No. PCT/NL2020/050174.
Search Report and Written Opinion issued in corresponding Dutch Application No. NL 2022790.
Paraforou, et al., "A Novel Supershaped Slot-Loaded Printed Dipole Antenna with Broadside Radiation for Dual-Band WLAN Applications", EuCAP 2014, pp. 2859-2862.

* cited by examiner

Frequency = 5.5 GHz_phi = 0 deg_plane

Frequency = 5.5 GHz_phi = 90 deg_plane

Frequency = 5.5 GHz_theta = 45 deg_plane

ANTENNA FOR IEEE 802.11 APPLICATIONS, WIRELESS DEVICE, AND WIRELESS COMMUNICATION SYSTEM

This is a National Phase Application filed under 35 U.S.C. 371 as a national stage of PCT/NL2020/050174, filed Mar. 16, 2020, an application claiming the benefit of Dutch Application No. 2022790, filed Mar. 22, 2019, the content of each of which is hereby incorporated by reference in its entirety.

The invention relates to an antenna, in particular suitable for IEEE 802.11 applications. The invention also relates to a wireless device, such as a wireless access point (AP), a router, a gateway, and/or a bridge, comprising at least one antenna according to the invention. The invention further relates to a wireless communication system, comprising a plurality of antennas according to the invention, and, preferably, a plurality of wireless devices according to the invention.

Typical modern WLAN-routers (Wireless Local Area Network routers) possess vertically polarized dipole-like (WiFi) antennas with omnidirectional radiation pattern. In urban and indoor wireless environments applications polarization of the propagating waves may change significantly due to scattering and complex multiple reflections. It can be shown that receiver with an additional horizontally polarized omnidirectional antenna can obtain up to 10 dB diversity gain than a receiver with only vertically polarized antennas. However, the current horizontally polarized (WiFi) antenna solutions suffer from the drawbacks that the antenna design is relatively bulky (large) and also requires a relatively large distance to a ground plane, which further affects the design of the antennas. Furthermore, the current horizontally polarized (WiFi) antenna exhibits a poor suppression of vertical electrical field components and typically requires expensive materials for manufacturing.

It is an object of the invention to provide an improved antenna for use in a WLAN-router or WLAN-access point.

To this end, the invention provides an antenna, in particular for use in and/or integration into a WLAN-router or WLAN-access point, comprising: a substantially flat, dielectric substrate, a conductive central feeding point, at least two, preferably at least three, folded dipole elements applied onto an upper side of said substrate, each folded dipole element comprising: a loop-shaped first conductor including a first at least partially curved inner conductor part and a first at least partially curved outer conductor part, wherein outer ends of the first inner conductor part are connected to respective outer ends of the first outer conductor part, and a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement. The antenna according to the invention has several advantages. Due to the circular geometry of the arrangement of the folded dipole elements the antenna according to the invention can be provided a relatively compact design (compact geometry), while still exhibiting an excellent antenna performance. Moreover, the new antenna design allows the substrate to be positioned relatively close to a ground plane, wherein a typical distance is ranging from 7.7 to 20 mm. Due to the compact design, the antenna according to the invention can be considered as a low-weight antenna. Furthermore, the antenna according to the invention exhibits an excellent omnidirectional radiation pattern, in particular due to the circular arrangement of the folded dipole elements. The antenna according to the invention preferably operates as omnidirectional horizontally polarized antenna. Additionally, the antenna according to the invention shows a high suppression of vertical electric field components, which is in favour of the antenna performance. An additional advantage of the antenna according to the invention is that the antenna can be manufactured by using low cost material, like a FR4 (fibre-reinforced epoxy) substrate. The antenna according to the invention also exhibits operation in a relatively large bandwidth, typically ranging from 5.15 GHz to 5.825 GHz. Moreover, the antenna according to the invention shows a relatively good matching, wherein the magnitude of the input reflection coefficient is typically smaller than −10 dB.

The antenna according to the invention can be used as stand-alone antenna, wherein the antenna typically also comprises a ground plane onto which the substrate is mounted, wherein the substrate is typically kept at a (small) distance from the ground plane. However, the antenna according to the invention is also very suitable to be installed within and/or integrated with a router, a bridge, an access point, and equivalent communication devices. The antenna according to the invention is typically configured to act in either a 2.4 GHz and/or a 5 GHz frequency band.

In the antenna according to the invention, the curved conductors of the folded dipole elements are arranged in a substantially circular arrangement. This means that the assembly of the curved conductors together defines a preferably circular profile.

In a preferred embodiment, the central feeding point comprises an upper patch applied onto the upper side of the dielectric substrate, wherein the first dipole branches are connected to said upper patch, and wherein the central feeding point comprises a lower patch applied onto the lower side of the dielectric substrate, wherein the second dipole branches are connected to said lower patch. Preferably, each second dipole branch is connected to the lower patch by a conductive via enclosed by a through hole made in the substrate. Typically, the folded dipole elements, the patches, and the vias are made of metal, such as copper. The folded dipole elements and the patches are typically applied onto the substrate by means of printing and/or deposition. Possibly, at least one patch of the upper patch and the lower patch has a substantially circular shape. It is also conceivable that at least one patch of the upper patch and the lower patch is substantially angular and/or irregularly shaped.

The antenna typically comprises a probing structure connected to said central feeding point. Preferably, the probing structure comprises a coaxial cable acting as a common feed line of each antenna segment. Preferably, the antenna is excited by a 50 Ohm coaxial transmission line (coaxial cable), wherein the inner conductor of the coaxial transmission line is connected to the upper circular patch and the outer conductor to the bottom circular patch. In this manner, only a single cable, instead of a plurality of cables, can be used to connect to the antenna, which is beneficial from a constructional and economic point of view, and typically leads to less interference with the antenna, and hence to an improved antenna performance. The length of the coaxial cable is defined by its application. The folded dipole elements forming the antenna are connected in parallel by connecting each first dipole branch to the upper patch and each second dipole branch to the lower patch.

Preferably, the first dipole branch and co-related second dipole branch are positioned parallel with respect to each other. Preferably, the first dipole branch and co-related second dipole branch are positioned close to each other. In this manner, a desired, at least partial, cancellation of the electromagnetic field components radiated by the opposite currents flowing along the dipole branches can be realized, which prevents or counteracts undesired (vertically polarized) radiation. To this end, it is favourable in case the first dipole branch and the second dipole branch of a folded dipole element have a substantially identical geometry.

In a preferred embodiment, in each folded dipole element, the length of the first dipole branch differs from, and preferably exceeds, the length of the second dipole branch of a folded dipole element. This typically facilitates the separated connection of the first and second dipole branches to a probing structure.

Preferably, in each folded dipole element, the curvature of the first inner conductor is substantially identical to the curvature of the first outer conductor. This leads to the situation that the first inner conductor and the first outer conductor are oriented in parallel. Preferably, in each folded dipole element, the radius of the first inner conductor and the radius of the first outer conductor substantially coincide with a central portion of the substrate and/or a central portion of the feeding point and/or a shared central portion of the different folded dipole elements. Hence, in this embodiment, the folded dipole elements typically extend from and/or are arranged around a central portion of the antenna. It is imaginable that the curvature of the first inner conductor varies (changes) along its length. It is also imaginable that the curvature of the first outer conductor varies along its length. The radius of the curvature of the first inner conductor and/or first outer conductor is typically at least 3 centimetre. Here it is imaginable that at least one segment of the first inner conductor and/or at least one segment of the first outer conductor has/have an infinite radius, which leads to a substantially straight (linear) segment. It could be preferred, that the first inner conductor and/or the first outer conductor has/have a curved center portion (center segment) and two peripheral less curved or linear end portions (end segments). This embodiment is in particular advantageous in case the substrate has a substantially corresponding shape, for example a (super)elliptic shape, in particular a hyperelliptic shape (i.e. a rectangular shape with rounded corners). This hyperelliptic shape is a species of a superelliptic shape, also known as Lamé curve, described by the formula $|x/a|^n+|y/b|^n=1$, for which $n>2$, and for which, preferably, $n<10$. Superellipses have a form partway between an ellipse and a rounded rectangle, or, if a=b, which is often preferred, partway between a circle and a rounded square. The curvature of the edge of the substrate can be followed by the curvature of the first inner conductor and first outer conductor.

Preferably, in each folded dipole element, the first inner conductor is connected to the outer ends of both the first and the second dipole branch. Opposite ends of said first and said second dipole branches are connected to the central feeding point. Typically, the first outer conductor has a greater length (width) than the first inner conductor. Hence, the first outer conductor preferably surrounds (encloses) the first inner conductor.

In a preferred embodiment, in order to enable the miniaturization of the antenna, each of the folded dipole elements comprises at least one second loop-shaped conductor including a second curved inner conductor part and a second curved outer conductor part, wherein outer ends of the second inner conductor part are connected to respective outer ends of the second outer conductor part, wherein different segments of the second outer conductor part are connected, respectively, to facing segments of the first conductor part by the first dipole branch and the second dipole branch. The second conductor is preferably situated in between the first conductor and the central feeding point. The curvature of the second inner conductor is preferably substantially identical to the curvature of the second outer conductor. The radius of the first inner conductor, the radius of the first outer conductor, the radius of the second inner conductor, and the radius of the second outer conductor, preferably substantially coincide with a central portion of the substrate and/or a central portion of the feeding point. The application of a second conductor, also referred to as small conductor or intermediate conductor, may improve the antenna performance.

Preferably, in each folded dipole element, at least one first inner conductor is connected to the outer ends of both the first and the second dipole branch. Hence, the first inner conductor is typically a segmented conductor, wherein a first conductor segment is connected to the first dipole branch and a second conductor segment is connected to the second dipole branch.

Preferably, the folded dipole elements are axisymmetric (rotation symmetric). This means that the folded dipole elements exhibit a symmetry around an axis, typically formed by a central portion of the antenna and/or a centre portion of the substrate. Typically, the folded dipole elements have an identical geometry. Typically, the folded dipole elements have identical dimensions. Preferably, the folded dipole elements mutually enclose substantially identical angles. Preferably, the antenna comprises at least four folded dipole elements.

The dielectric substrate is preferably formed by a circular plate. The radius of the plate normally (slightly) exceeds the size/radius of the folded dipole elements. The substrate may have (super)elliptic shape, in particular a hyperelliptic shape. This hyperelliptic shape is a species of a superelliptic shape, also known as Lame curve, described by the formula $|x/a|^n+|y/b|^n=1$, for which $n>2$, and for which, preferably, $n<10$. Superellipses have a form partway between an ellipse and a rounded rectangle, or, if a=b (e.g. a=b=1), which is often preferred, partway between a circle and a rounded square. Preferably, the circular and/or hyperelliptic substrate is designed as compact as possible. Preferably, the dielectric substrate has a width and/or diameter of between 28 and 32 mm, preferably a width and/or diameter of 30 mm. This dimensioning makes the antenna as such well suitable to operate in the 5 GHz frequency band. Preferably, the dielectric substrate is at least partially made of a polymer material, preferably a composite material composed of woven fiberglass cloth with an epoxy resin binder, more preferably a composite material composed of woven fiberglass cloth with a flame-resistant epoxy resin binder, such as FR4. The thickness of the substrate is preferably situated in between 0.4 and 0.6 mm, and preferably equals to 0.5 mm.

It is also conceivable that the dielectric substrate at least partially follows the shape of at least one, and preferably each folded dipole element, and in particular the shape of at least one first curved outer conductor part. This may contribute to a further improved antenna signal.

Typically, the dielectric substrate is provided with a central hole for accommodating a part of a probing structure, in particular the coaxial cable referred to above.

The antenna comprises a conductive ground plane, and at least a dielectric carrier for mounting the dielectric substrate and the folded dipole elements applied onto an upper side of said substrate, onto the ground plane. The dielectric carrier acts as distance holder. Typically, the dielectric carrier is made of polymer, more preferably manufactured by using injection-moulding process. The dielectric carrier preferably supports (only) a central portion of the antenna. Preferably, a single dielectric carrier is used to support the antenna, which is beneficial from a constructional and economic point of view. Preferably, the dielectric carrier, also known as antenna support of antenna mount, comprises, preferably a single, through hole, also referred to as a cable channel, for guiding at least one probing cable, such as a coaxial cable to the central feeding point of the antenna. The through hole (cable channel) will protect the probing cable(s) from damaging, and therefore the antenna from malfunctioning, and leads to a more lean, economic, and durable design. Moreover, interference between the probing cable(s) and the antenna can be reduced seriously in this manner, which increases—the reliability and durability—of the antenna performance.

The ground plane is typically made of metal. The size of the ground plane typically (significantly) exceeds the size of the dielectric substrate. The ground plane may be rectangular, in particular square, or may have a circular of hyperelliptic shape.

The antenna is configured to operate in the 5 GHz frequency band and/or the 2.4 GHz frequency band. The operational frequency band depends on various factors, including the size of the substrate, including the size of the folded dipole elements, and including the shortest distance between the substrate and the ground plane.

In a further preferred embodiment, the shape of at least one folded dipole element, and in particular the first curved outer conductor part and/or the first curved inner conductor part of the dipole elements, is at least partially defined by the polar function:

$$\rho_d(\varphi) = \frac{1}{\sqrt[n_1]{\left|\frac{1}{a}\cos\frac{m_1}{4}\varphi\right|^{n_2} +/- \left|\frac{1}{b}\sin\frac{m_2}{4}\varphi\right|^{n_3}}}$$

$$a, b \in \mathbb{R}^+;\ m_1, m_2, n_1, n_2, n_3 \in \mathbb{R},\ a, b, n_1 \neq 0$$

wherein:

$\rho_d(\varphi)$ is a curve located in the XY-plane;

$\varphi \in [0, 2\pi)$ is the angular coordinate; and $m_1 \neq 0$, $m_2 \neq 0$, and wherein at least one of $n_1$, $n_2$, and $n_3$ does not equal 2.

This particular shape of the at least one folded dipole element defined by said polar function may positively affect the voltage standing wave ratio and/or the impedance matching of the antenna.

The invention also relates to a wireless device, such as a wireless access points (AP), a router, a gateway, and/or a bridge, comprising at least one antenna according to the invention.

The invention further relates to a wireless communication system, comprising a plurality of antennas according to the invention, and, preferably, a plurality of wireless devices according to the invention.

Further non-limitative embodiments of the invention are presented in the below set of clauses:

1. Antenna, in particular for IEEE 802.11 applications, comprising:

a substantially flat, dielectric substrate, a conductive central feeding point, at least three folded dipole elements applied onto an upper side of said substrate, each folded dipole element comprising:

a loop-shaped first conductor including a first curved inner conductor part and a first curved outer conductor part, wherein outer ends of the first inner conductor part are connected to respective outer ends of the first outer conductor part, and a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a substantially circular arrangement.

2. Antenna according to clause 1, wherein the antenna is configured to act as omnidirectional horizontally polarized antenna.

3. Antenna according to Clause 1 or 2, wherein the central feeding point comprises an upper patch applied onto the upper side of the dielectric substrate, wherein the first dipole branches are connected to said upper patch, and wherein the central feeding point comprises a lower patch applied onto the lower side of the dielectric substrate, wherein the second dipole branches are connected to said lower patch.

4. Antenna according to clause 3, wherein each second dipole branch is connected to the lower patch by a conductive via enclosed by a through hole made in the substrate.

5. Antenna according to clause 3 or 4, wherein at least one patch of the upper patch and the lower patch has a substantially circular shape.

6. Antenna according to one of the foregoing clauses, wherein the antenna comprises a probing structure connected to said central feeding point.

7. Antenna according to clause 6, wherein the probing structure comprises a coaxial cable acting as a common feed line of each antenna segment.

8. Antenna according to clause 7, wherein an inner conductor of the coaxial cable is connected to the upper patch and an outer conductor of the coaxial cable is connected to the lower patch.

9. Antenna according to one of the foregoing clauses, wherein the first dipole branch and the second dipole branch are oriented and designed such that, during use, the electromagnetic field components radiated by the opposite currents flowing through said dipole branches at least partially cancel out each other.

10. Antenna according to one of the foregoing clauses, wherein the first dipole branch and the second dipole branch of a folded dipole element are oriented in parallel.

11. Antenna according to one of the foregoing clauses, wherein the first dipole branch and the second dipole branch of a folded dipole element have a substantially identical geometry.

12. Antenna according to one of the foregoing clauses, wherein, in each folded dipole element, the length of the first dipole branch exceeds the length of the second dipole branch of a folded dipole element.

13. Antenna according to one of the foregoing clauses, wherein, in each folded dipole element, the curvature of the first inner conductor is substantially identical to the curvature of the first outer conductor.

14. Antenna according to one of the foregoing clauses, wherein, in each folded dipole element, the radius of the first inner conductor and the radius of the first outer conductor substantially coincide with a central portion of the substrate and/or a central portion of the feeding point.

15. Antenna according to one of the foregoing clauses, wherein, in each folded dipole element, at least one first inner conductor is connected to the outer ends of both the first and the second dipole branch.

16. Antenna according to one of the foregoing clauses, wherein each of a plurality of folded dipole elements comprises at least one second loop-shaped conductor including a second curved inner conductor part and a second curved outer conductor part, wherein outer ends of the second inner conductor part are connected to respective outer ends of the second outer conductor part, wherein different segments of the second outer conductor part are connected, respectively, to facing segments of the first conductor part by the first dipole branch and the second dipole branch.

17. Antenna according to clause 16, wherein the width of the first conductor exceeds the width of the second conductor.

18. Antenna according to clause 16 or 17, wherein the second loop-shaped conductor is situated in between the first conductor and the central feeding point.

19. Antenna according to one of clauses 16-18, wherein the curvature of the second inner conductor is substantially identical to the curvature of the second outer conductor.

20. Antenna according to one of clauses 16-19, wherein the radius of the first inner conductor, the radius of the first outer conductor, the radius of the second inner conductor, and the radius of the second outer conductor, substantially coincide with a central portion of the substrate and/or a central portion of the feeding point.

21. Antenna according to one of the foregoing clauses, wherein, in each folded dipole element, at least one first inner conductor is connected to the outer ends of both the first and the second dipole branch.

22. Antenna according to one of the foregoing clauses, wherein the folded dipole elements are axisymmetric.

23. Antenna according to one of the foregoing clauses, wherein the folded dipole elements mutually enclose substantially identical angles.

24. Antenna according to one of the foregoing clauses, wherein the antenna comprises at least four folded dipole elements.

25. Antenna according to one of the foregoing clauses, wherein the folded dipole elements and the feeding point are at least partially made of metal, preferably copper.

26. Antenna according to one of the foregoing clauses, wherein the dielectric substrate is formed by a circular plate.

27. Antenna according to one of the foregoing clauses, wherein the dielectric substrate has a width and/or diameter of between 28 and 32 mm, preferably a width and/or diameter of 30 mm.

28. Antenna according to one of the foregoing clauses, wherein the dielectric substrate is provided with a central hole for accommodating a part of a probing structure.

29. Antenna according to one of the foregoing clauses, wherein the dielectric substrate is at least partially made of a polymer material, preferably a composite material composed of woven fiberglass cloth with an epoxy resin binder, more preferably a composite material composed of woven fiberglass cloth with a flame-resistant epoxy resin binder.

30. Antenna according to one of the foregoing clauses, wherein the thickness of the substrate is situated in between 0.4 and 0.6 mm, and preferably equals to 0.5 mm.

31. Antenna according to one of the foregoing clauses, wherein the antenna comprises a conductive ground plane, and at least a dielectric carrier for mounting the dielectric substrate and the folded dipole elements applied onto an upper side of said substrate, onto the ground plane.

32. Antenna according to one of the foregoing clauses, wherein the antenna is configured to operate in the 5 GHz frequency band or in the 2.4 GHz frequency band.

33. Antenna according to one of the foregoing clauses, wherein a lower side and/or an upper side of the antenna is covered by at least one dielectric structure, in particular a dielectric plate.

34. Wireless device, such as a wireless access points (AP), a router, a gateway, and/or a bridge, comprising at least one antenna according to one of the foregoing clauses.

35. Wireless communication system, comprising a plurality of antennas according to one of clauses 1-32, and, preferably, a plurality of wireless devices according to clause 33.

The invention will be elucidated on the basis of non-limitative exemplary embodiments shown in the enclosed figures. In these embodiments, similar reference signs correspond to similar or equivalent features or elements.

DETAILED DESACRIPTION

Figure 1A:
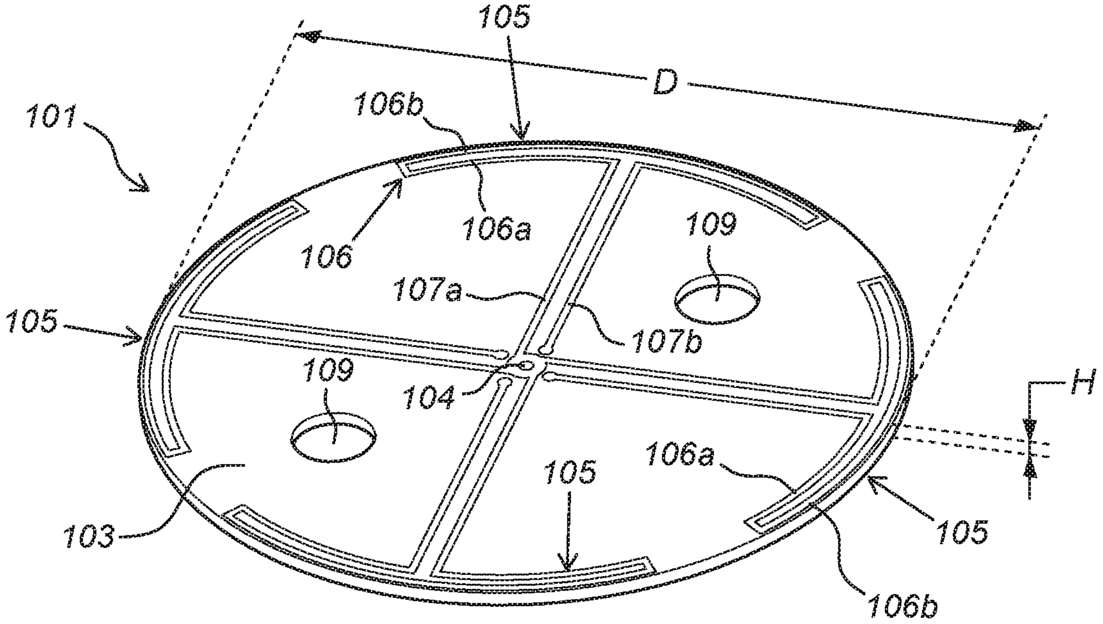
FIG. 1*a* shows a schematic representation of an antenna according to the present invention.
Figure 1B:
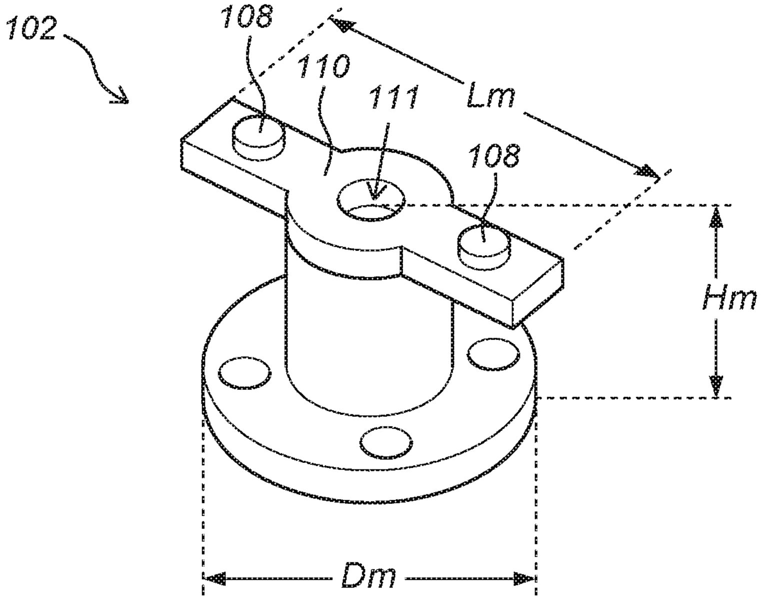
FIG. 1*b* shows a dielectric carrier for mounting the antenna onto a ground plane.
Figure 1C:
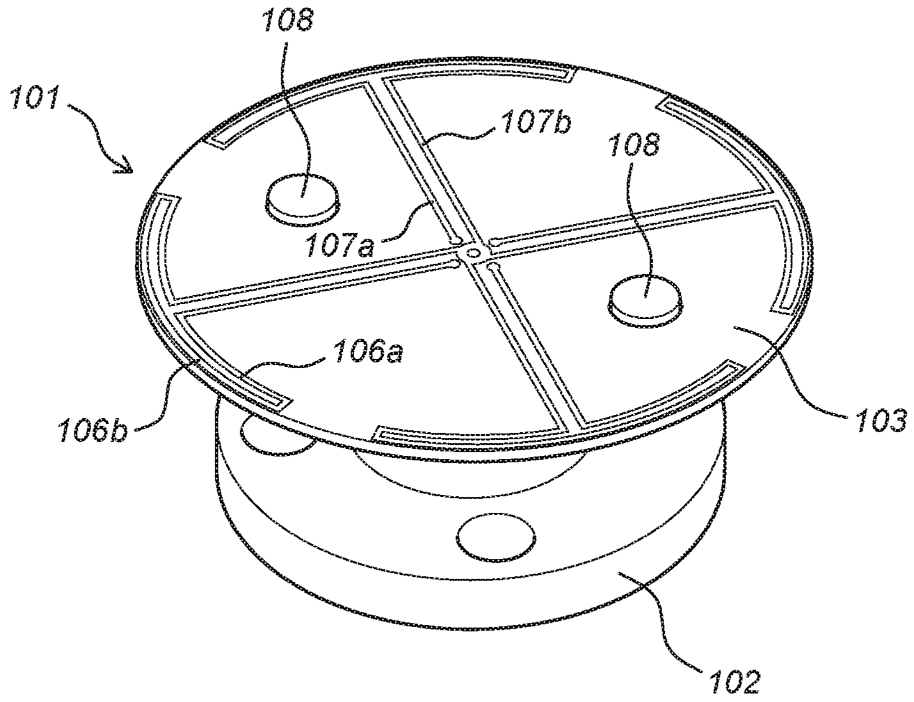
FIG. 1*c* shows the antenna of FIG. 1*a* in combination with the dielectric carrier of FIG. 1*b*.

FIG. 1*a* shows an antenna (101), being in particular suitable for IEEE 802.11 applications. The antenna (101) comprises a substantially flat, dielectric substrate (103), a conductive central feeding point (104) and four folded dipole elements (105) applied onto an upper side of said substrate (103). Each folded dipole element (105) comprises a loop-shaped first conductor (106) including a first curved inner conductor part (106*a*) and a first curved outer conductor part (106*b*), wherein outer ends of the first inner conductor part (106*a*) are connected to respective outer ends of the first outer conductor part (106*b*), and a first conductive dipole branch (107*a*) and a second conductive dipole branch (107*b*), both dipole branches being connected, respectively, to different segments of said first inner conductor part (106*a*), wherein both dipole branches (107*a*, 107*b*) are also connected to said central feeding point (104). The figure shows that the conductors (106) of the folded dipole elements (105) being arranged in a substantially circular arrangement. Hence, the antenna (101) is configured to act as omnidirectional horizontal polarized antenna. The folded dipole elements (105) are positioned substantially on the outer perimeter of the dielectric substrate (103). Each folded dipole element (105), and in particular the conductor parts (106) are positioned a predefined distance of an adjacent conductor part (106). The central feeding point (104) comprises an upper patch applied onto the upper side of the dielectric substrate, wherein the first dipole branches (107*a*) are connected to said upper patch, and wherein the central feeding point comprises a lower patch applied onto the lower side of the dielectric substrate, wherein the second dipole branches (107*b*) are connected to said lower patch. This shown in more detail in FIGS. 2*a* and 2*b*. It can be seen that the first inner conductor parts (106*a*) are positioned at a distance from the first outer conductor parts (106*b*). In the shown embodiment is the distance between said conductor parts (106*a*, 106*b*) substantially equal to the distance between the dipole branches (107*a*, 107*b*). The first conductive dipole branch (107*a*), a first part of the first inner conductor part (106*a*), the first outer conductor part (106*b*), a second part of the first inner conductor part (106) and the second conductive dipole branch (107*b*) substantially form a loop from the central feeding point (104). In a non-limiting preferred embodiment, the dielectric substrate (103) has a diameter D of 3.0 cm and a thickness H of 0.50 mm. FIG. 1*b* shows a possible configuration of a dielectric carrier (102) for mounting the antenna such as shown in FIG. 1*a* onto a ground plane (shown in FIG. 4). The dielectric carrier (102) comprises contact elements (108) which are configured for engaging part of the antenna (101). The contact elements (108) are configured to be received within a through hole (109) of the antenna (101), as shown in FIG. 1*c*. The contact elements (108) are position onto a mounting support surface (110). Possible non-limiting dimensions of the dielectric carrier (102) are height Hm is 1.5 cm, length Lm of the mounting support surface (110) is 2.5 cm and diameter Dm is 2.0 cm. The dielectric carrier (102) further comprises a through hole (111) for receiving part of a probing structure (not shown).

Figure 2A:
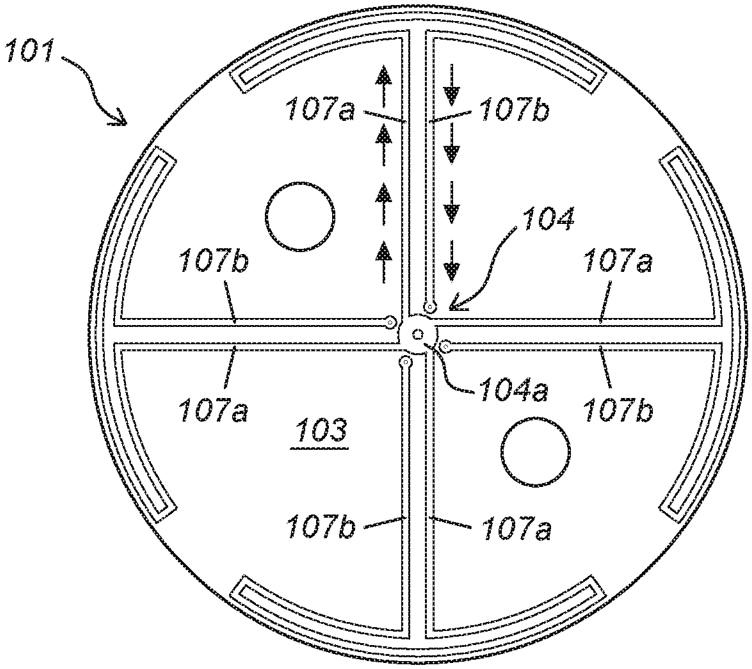
FIG. 2*a* shows a top view of the antenna of FIG. 1*a*.
Figure 2B:
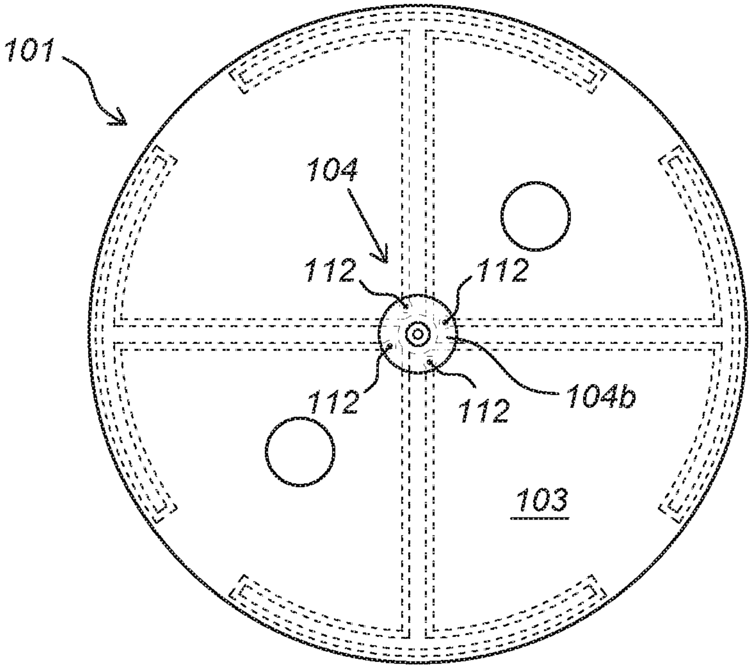
FIG. 2*b* shows a bottom view of the antenna of FIG. 1*c*.

FIGS. 2*a* and 2*b* show a top view (FIG. 2*a*) and a bottom view (FIG. 2*b*) of the antenna (101) as shown in FIGS. 1*a* and 1*c*. The figures show that the central feeding point (104) comprises an upper patch (104*a*) applied onto the upper side of the dielectric substrate (103), wherein the first dipole branches (107*a*) are connected to said upper patch (104*a*), and wherein the central feeding point (104) comprises a lower patch (104*b*) applied onto the lower side of the dielectric substrate (103), wherein the second dipole branches (107*b*) are connected to said lower patch (104*b*). Each second dipole branch (107*b*) is configured to be connected to the lower patch (104*b*) by a conductive via enclosed by a through hole (112) made in the substrate. The upper patch (104*a*) and the lower patch (104*b*) have a substantially circular shape in the shown embodiment. The arrows indicate the flow of current. Hence it can be seen that the first dipole branch (107*a*) and the second dipole branch (107*b*) are oriented and designed such that, during use, the electromagnetic field components radiated by the opposite currents flowing through said dipole branches (107*a*, 107*b*) at least partially cancel out each other.

Figure 3:
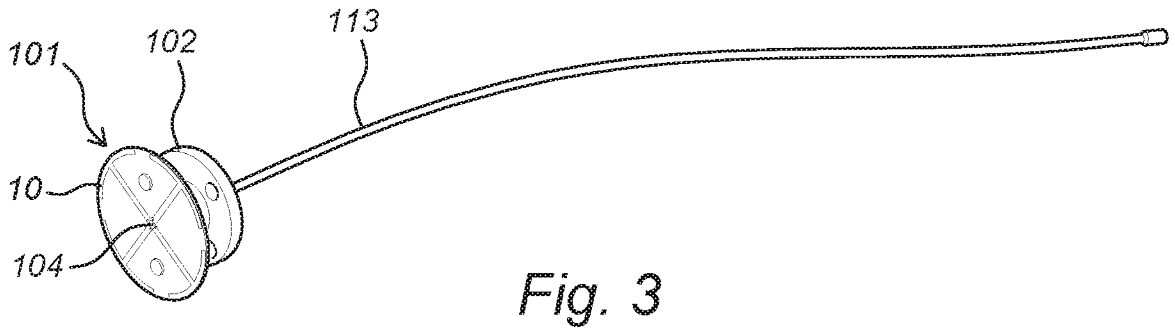
FIG. 3 shows a perspective view of the antenna and the dielectric carrier in combination with a probing structure.

FIG. 3 shows a perspective view of the components shown in the previous figures in combination with a probing structure (113) connected to the central feeding point (104) of the antenna (101). The probing structure (113) comprises a coaxial cable (113) acting as a common feed line of each folded dipole element (105). The inner conductor of the coaxial cable (113) is connected to the upper patch and the outer conductor of the coaxial cable is connected to the lower patch of the central feeding point (104).

Figure 4:
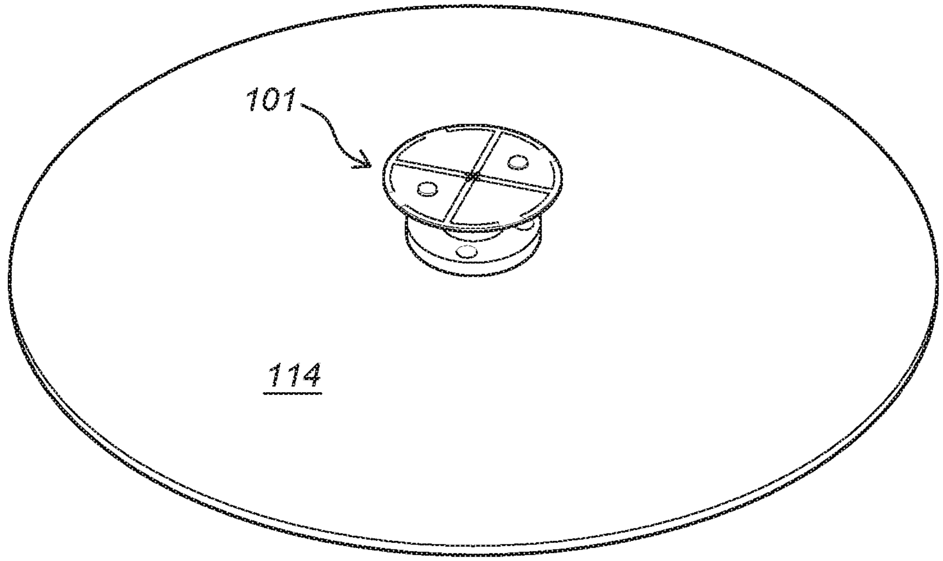
FIG. 4 shows a perspective view of the antenna of FIG. 3.

FIG. 4 shows a perspective view of the antenna (101) shown in FIG. 3, wherein the antenna (101) comprises a conductive ground plane (114). The antenna (101) is mounted to the conductive ground plane (114) via at least one dielectric carrier. It can be seen that the conductive ground plane (114) has a relatively large surface area.

Figure 5:
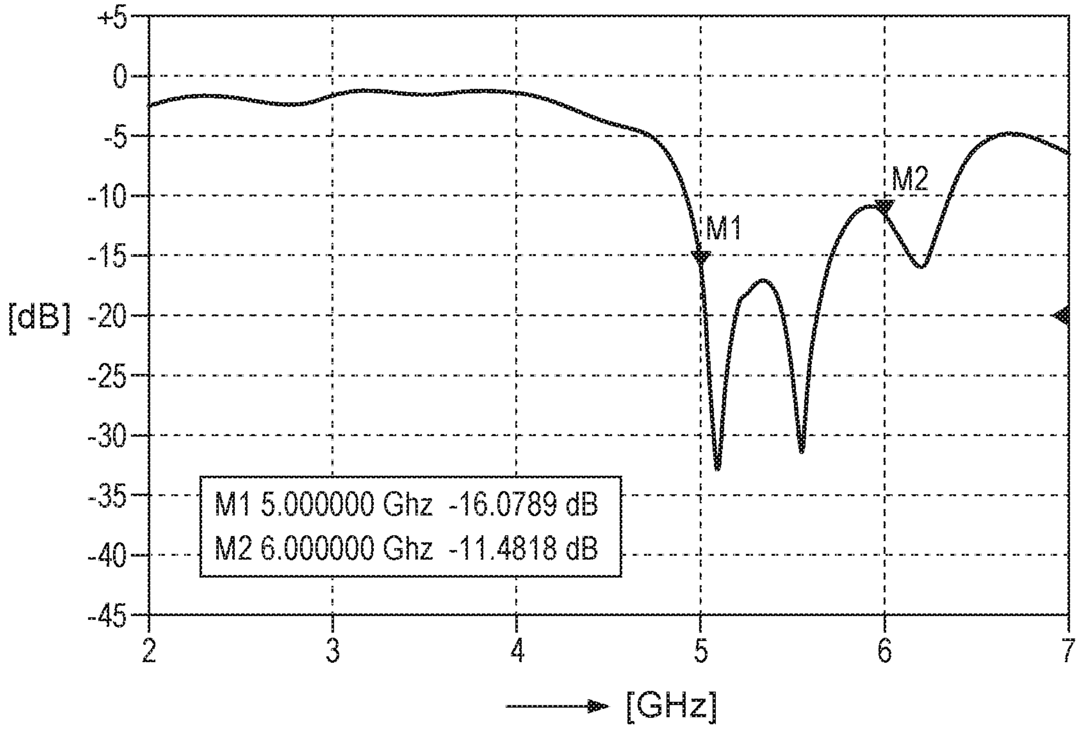
FIG. 5 shows a graph representing the measured magnitude of the input reflection coefficient of the antenna positioned 1.5 cm above a conductive ground plane.

FIG. 5 shows a graph presenting the measured magnitude of the input reflection coefficient of an antenna as shown in the previous figures positioned 1.5 cm above a conductive ground plane. The x-axis shows the frequency in GHz and the y-axis of the graph shows the magnitude of the input reflection coefficient in dB.

Figure 6:
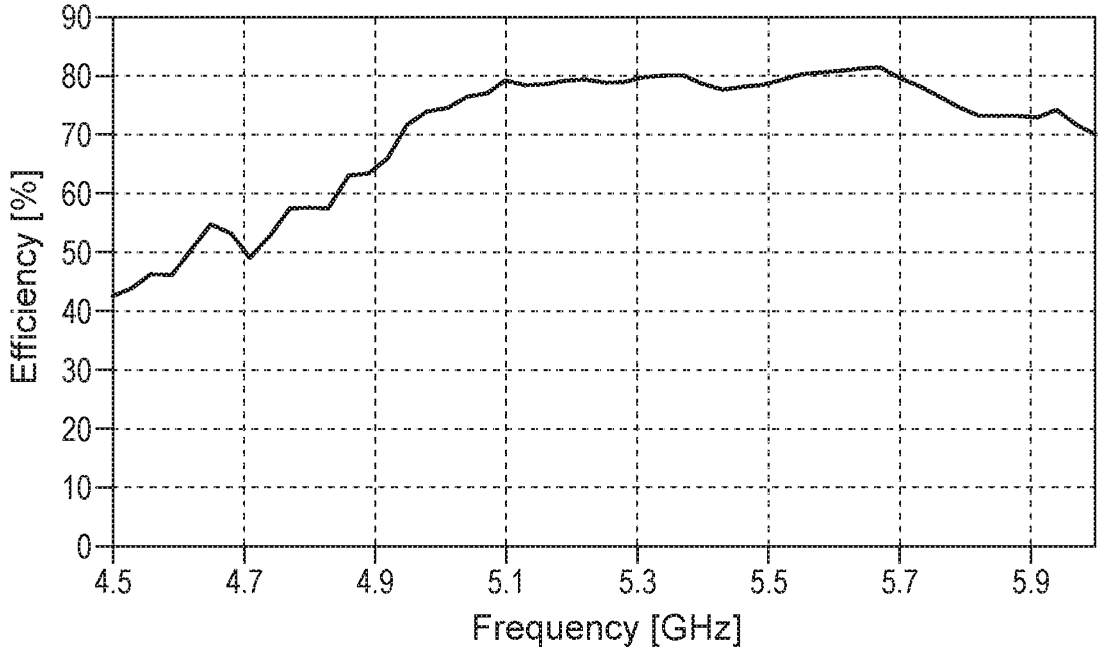
FIG. 6 shows a graph representing the total efficiency of the antenna.

FIG. 6 shows a graph indicating the total efficiency of an antenna according to the present invention. It can be seen that the total efficiency of the antenna is relatively high, about 80%, when operating at frequencies of 5 GHz up to 5.6 GHz. The antenna used for the measurement is an antenna as shown in the previous figures positioned 1.5 cm above a conductive ground plane.

Figure 7:
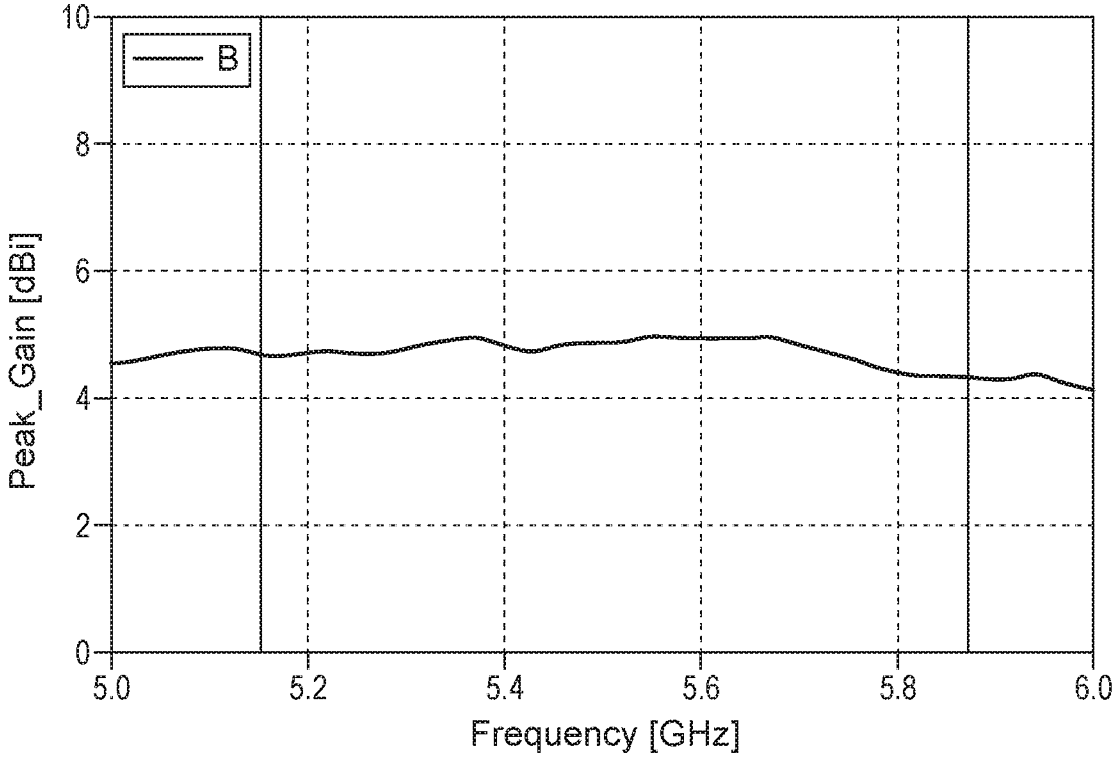
FIG. 7 shows a graph representing the measured antenna realized gain.

FIG. 7 shows the measured antenna realized gain, indicating a figure of merit which combines the antenna directivity and total efficiency, in dBi for an antenna as shown in the previous figures positioned 1.5 cm above a conductive ground plane. The x-axis shows the frequency in GHz, the y-axis shows the antenna realized gain.

Figure 8A:
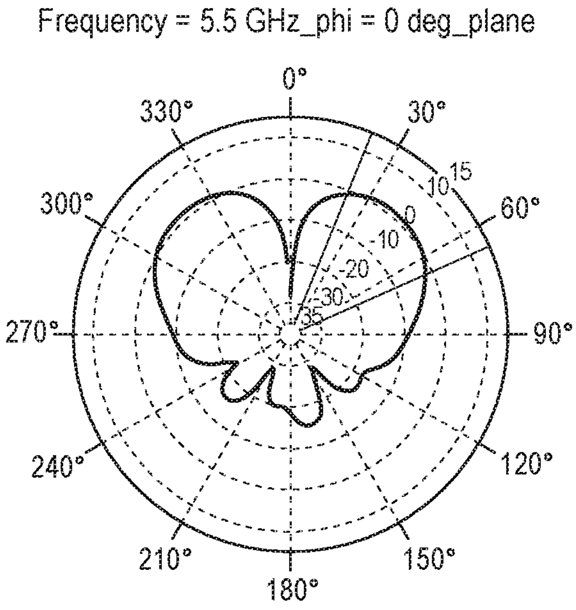
FIGS. 8*a*, 8*b* and 8*c* show the measured radiation patterns of the horizontally polarized component of the electromagnetic field radiated at 5.5 GHz by the antenna.
Figure 8B:
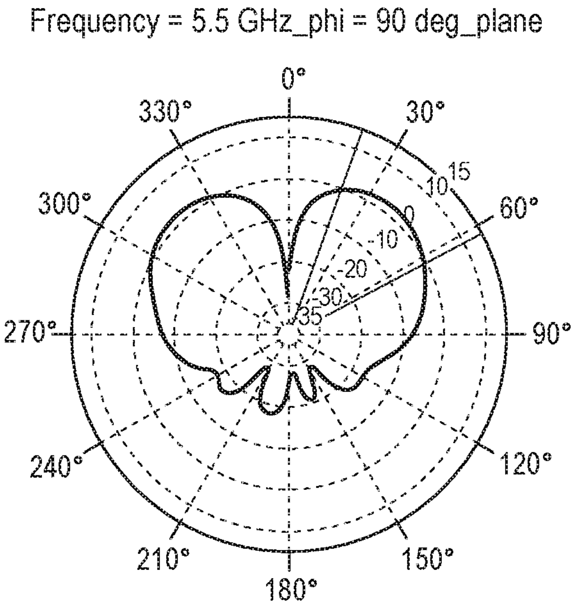
Figure 8C:
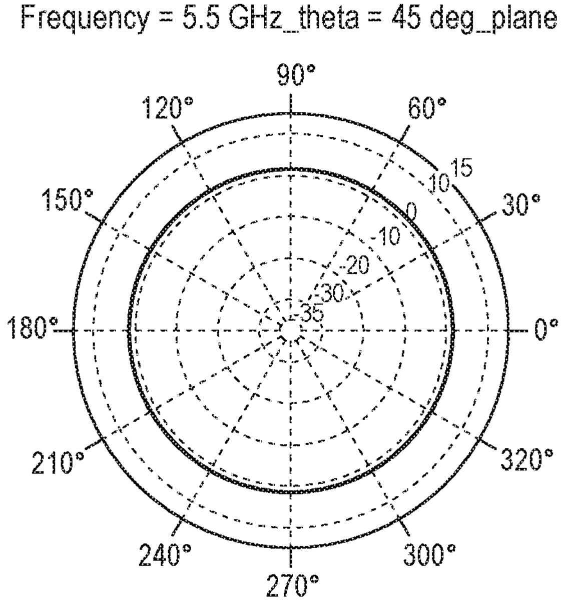
Figure 8D:
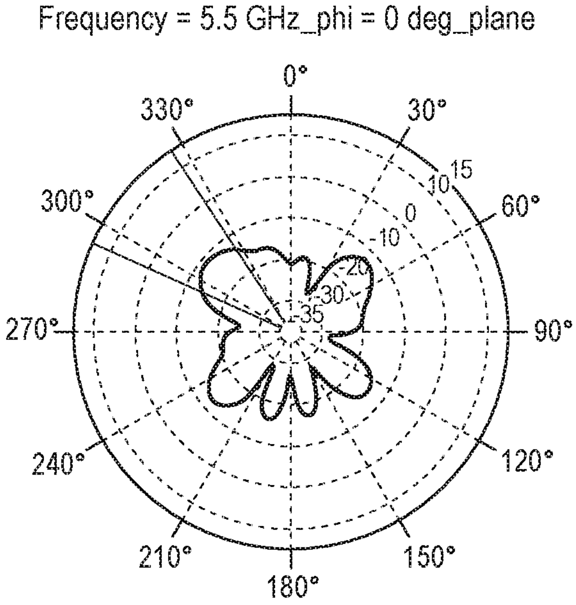
FIGS. 8*d*, 8*e* and 8*f* show the measured radiation patterns of the vertically polarized component of the electromagnetic field radiated at 5.5 GHz by the antenna.
Figure 8E:
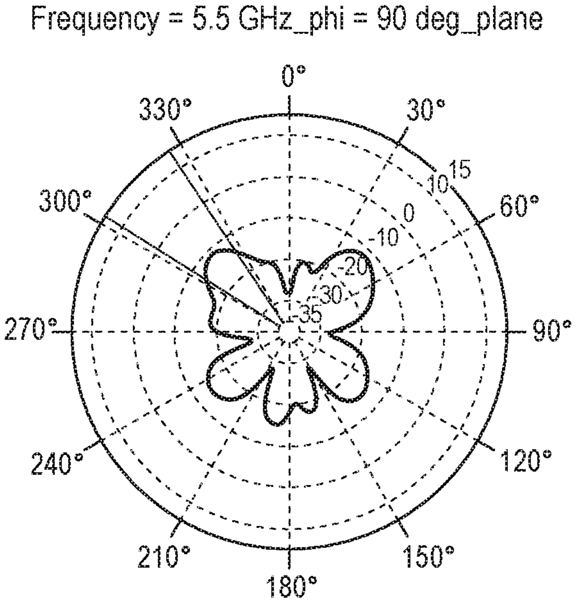
Figure 8F:
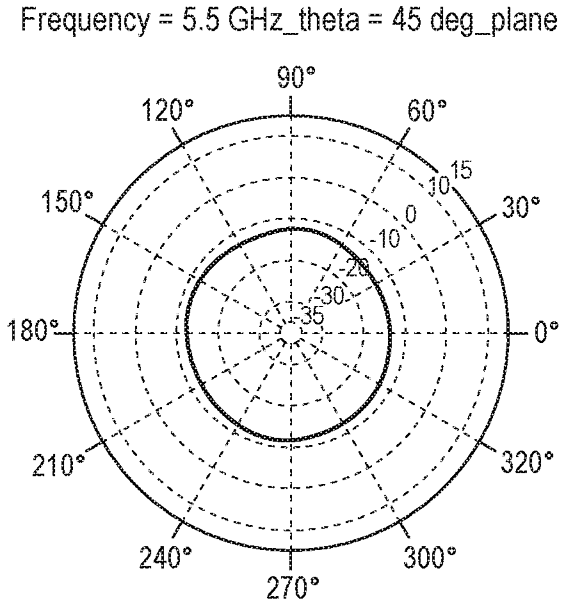

FIGS. 8*a*-8*f* show the measured radiation patterns of the horizontally polarized component (FIGS. 8*a*, 8*b*, 8*c*) and vertically polarized component (FIGS. 8*d*, 8*e*, 8*f*) of the electromagnetic field radiated at 5.5 GHz by an antenna according to the present invention. The antenna used for the measurement is an antenna as shown in the previous figures positioned 1.5 cm above a conductive ground plane. FIGS. 8*a* and 8*d* show the xz-plane, FIGS. 8*b* and 8*e* the xy-plane and FIGS. 8*c* and 8*f* the xy-plane for an elevation angle equal to 45 degrees.

Figure 9:
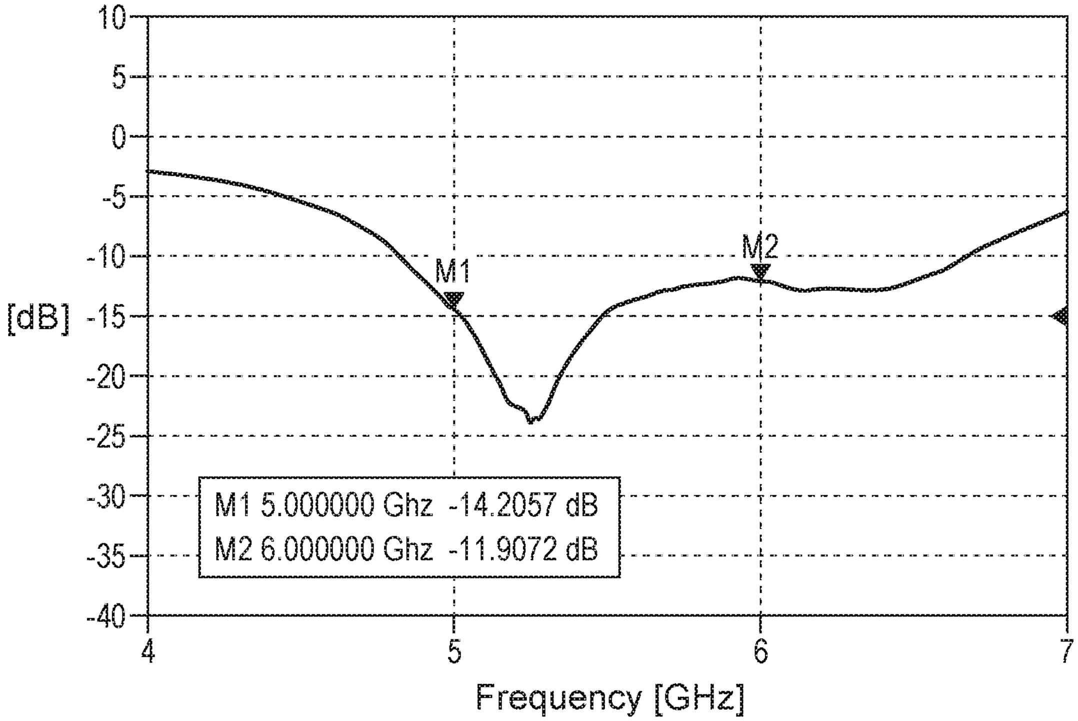
FIG. 9 shows a graph representing the measured magnitude of the input reflection coefficient of the antenna positioned 1.0 cm above a conductive ground plane.

FIG. 9 shows a graph presenting the measured magnitude of the input reflection coefficient of an antenna as shown in the previous figures positioned 1.0 cm above a conductive ground plane. The x-axis shows the frequency in GHz and the y-axis of the graph shows the magnitude of the input reflection coefficient in dB. Specific measurement points are shown in the graph.

Figure 10:
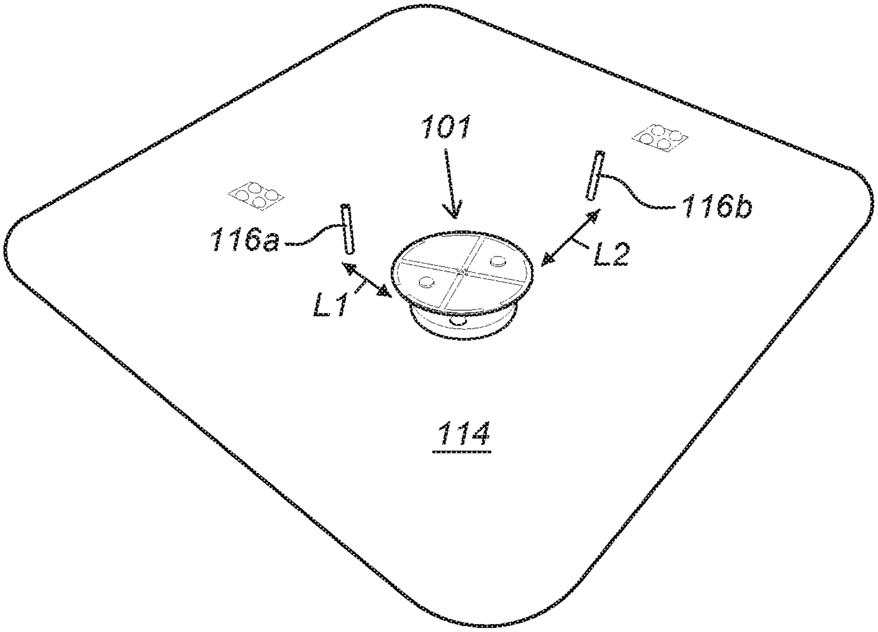
FIG. 10 shows a perspective view of a set-up for a coupling measurement of a couple of monopoles and the antenna.

FIG. 10 shows a perspective view of a set-up for a coupling measurement of a couple of monopoles (116*a*, 116*b*) and the antenna (101) according to the invention. In the shown set-up is the antenna (101) positioned 1.0 cm above the conductive ground plane (114). A first monopole (116*a*) is positioned at L1 is 2 cm from the antenna, and a second monopole (116*b*) is positioned at L2 is 4 cm from the antenna.

Figure 11A:
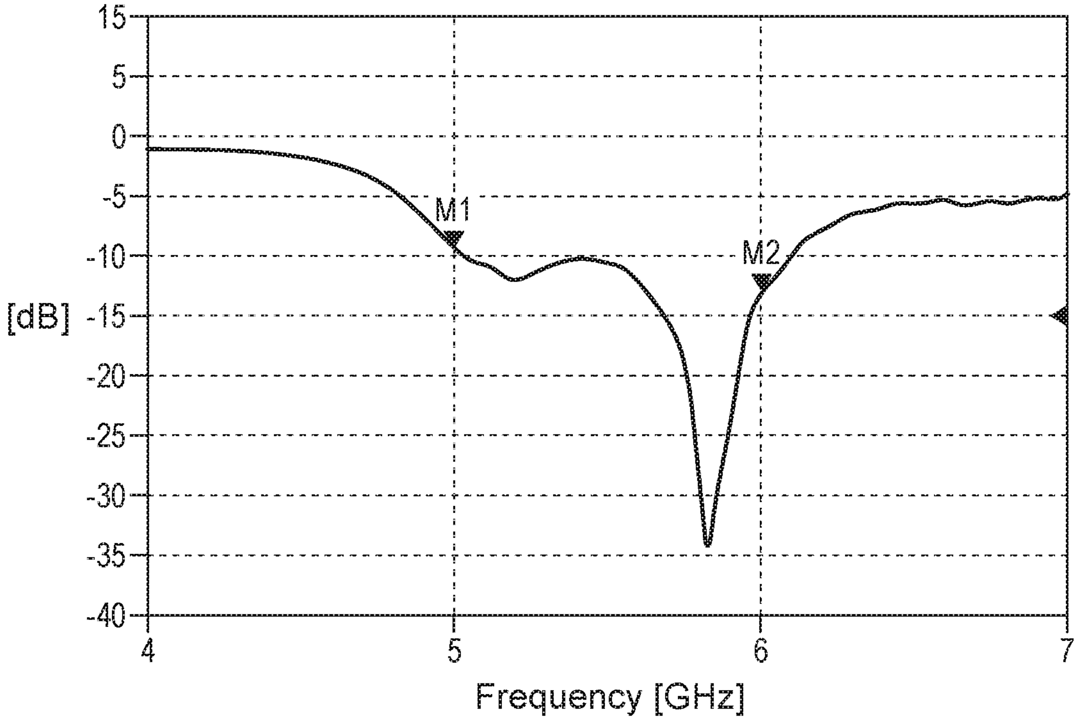
FIGS. 11*a* and 11*b* show graphs representing the measured magnitude of the input reflection coefficient of a monopole and the antenna.
Figure 11B:
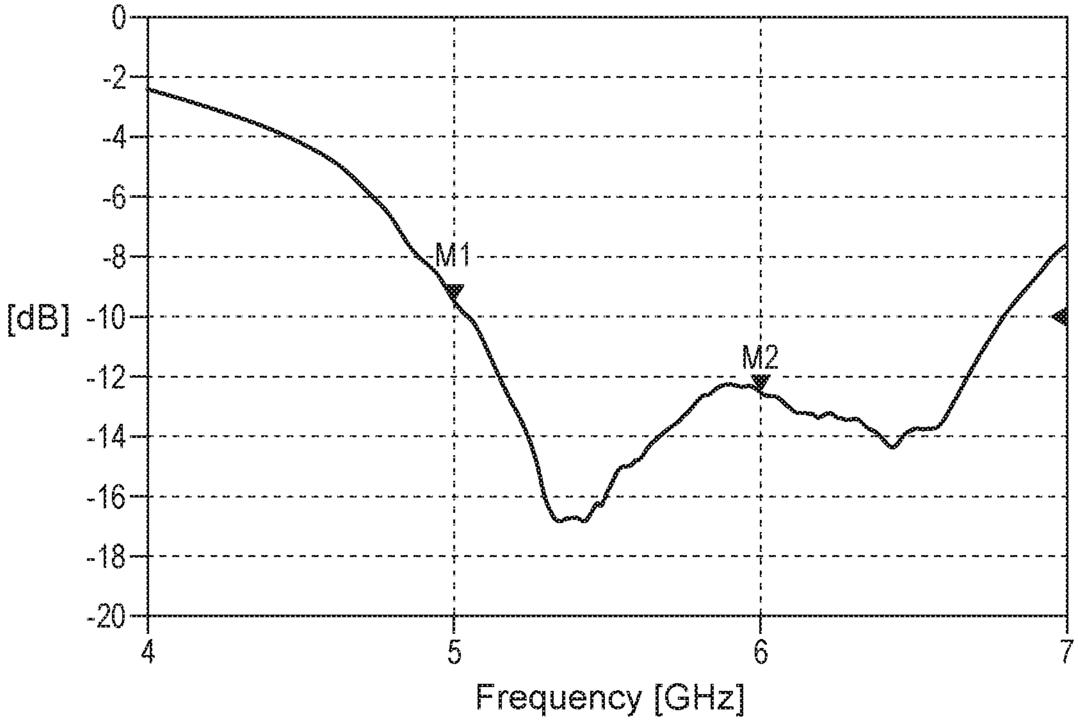
Figure 11C:
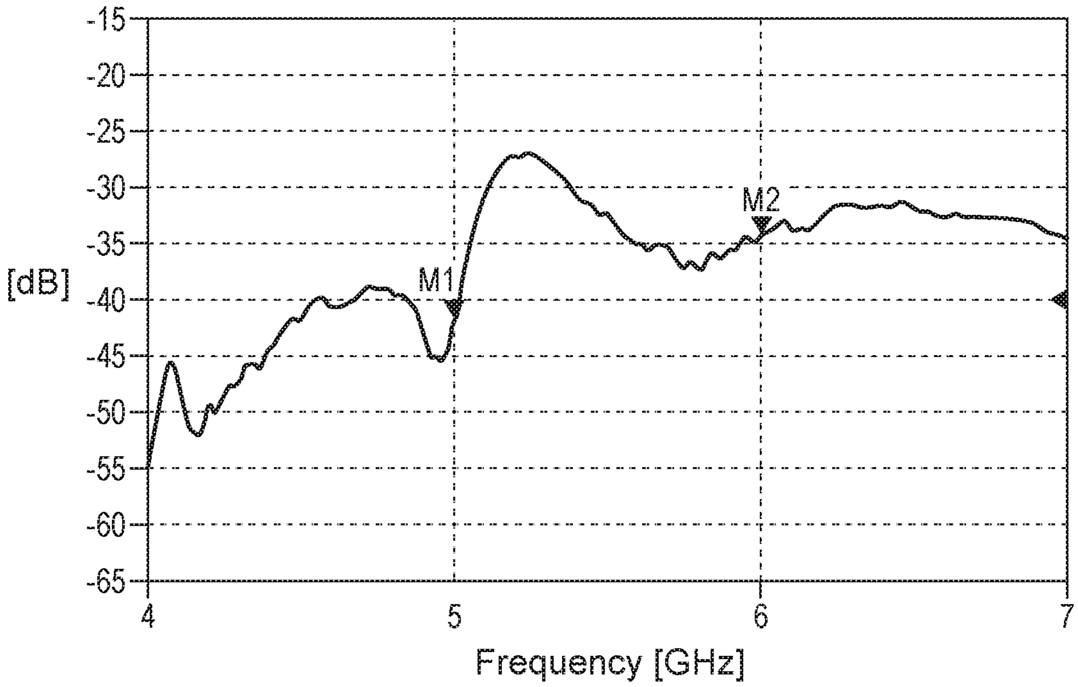
FIGS. 11*c* and 11*d* show graphs representing the measured coupling of a monopole and the antenna.
Figure 11D:
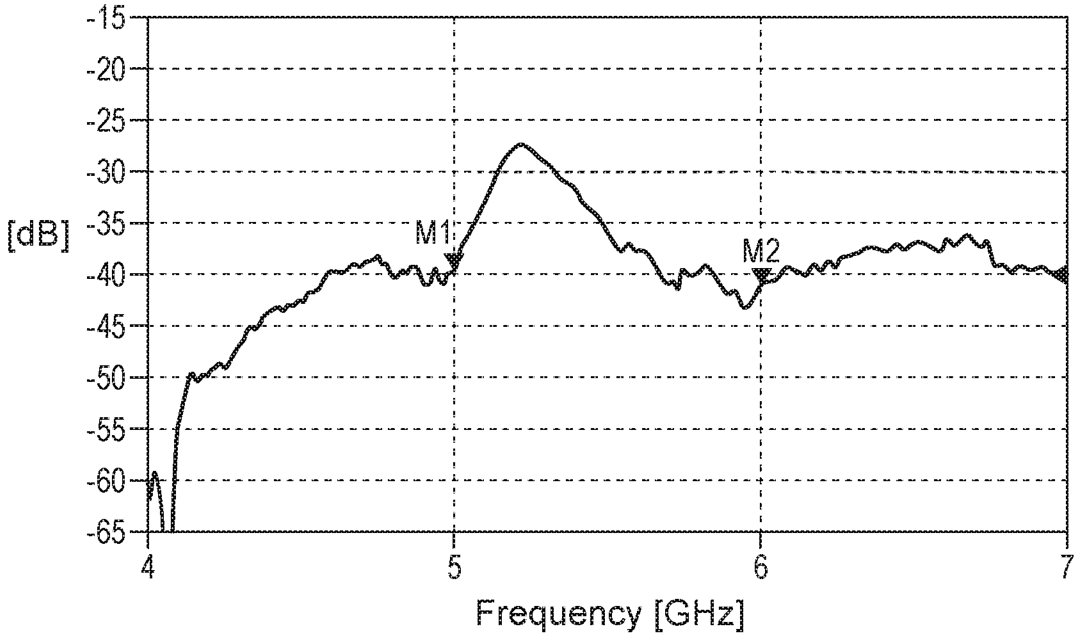

FIGS. 11*a* and 11*b* show graphs of the measured magnitude of the input reflection coefficient of a monopole and the antenna according to the invention. FIG. 11*a* shows the measured magnitude of the input reflection coefficient of each monopole (116*a*, 116*b*) as shown in FIG. 10. FIG. 11*b* shows the graph of the measured magnitude of the input reflection coefficient of the antenna (101) according to the invention as shown in FIG. 10. FIGS. 11*c* and 11*d* show a graph of the measured coupling of a monopole and an antenna according to the invention. FIG. 11*c* shows the measured coupling of the first monopole (116*a*) positioned at 20 mm from the antenna (101) as shown in FIG. 10. FIG. 11*d* shows a graph of the measured coupling of the second monopole (116*b*) positioned at 40 mm from the antenna (101) as shown in FIG. 10.

Figure 12:
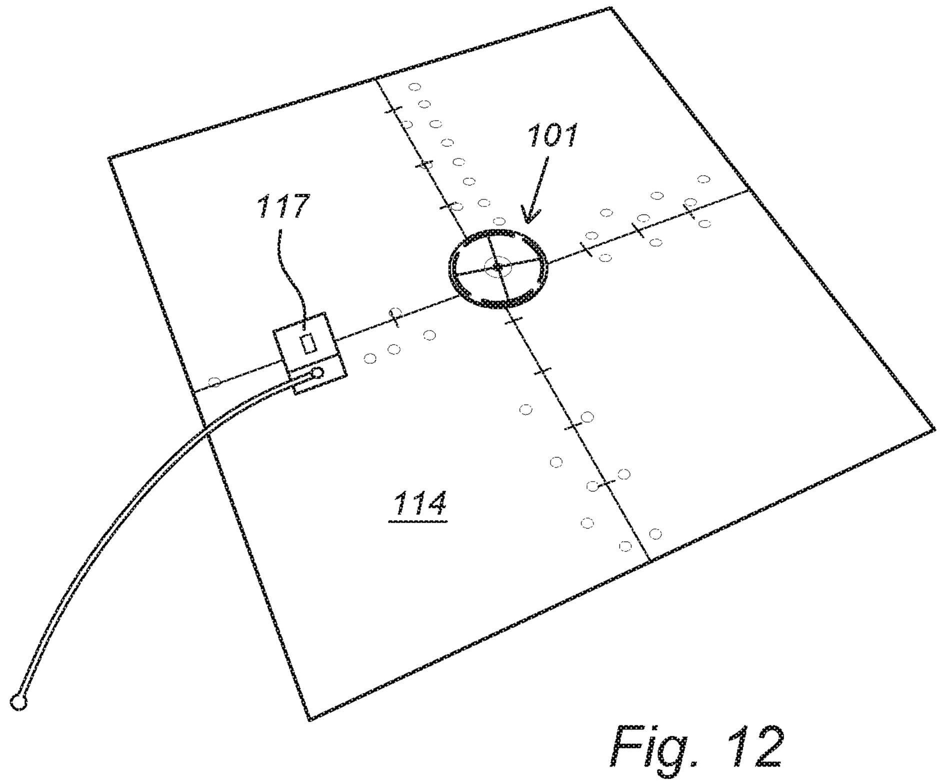
FIG. 12 shows a perspective view of a set-up for a coupling measurement of the antenna on a ground plane and an inverted-F antenna.

FIG. 12 shows a perspective view of a set-up for a coupling measurement of an antenna (101) according to the invention on a ground plane (114) and an inverted-F antenna (117).

Figure 13A:
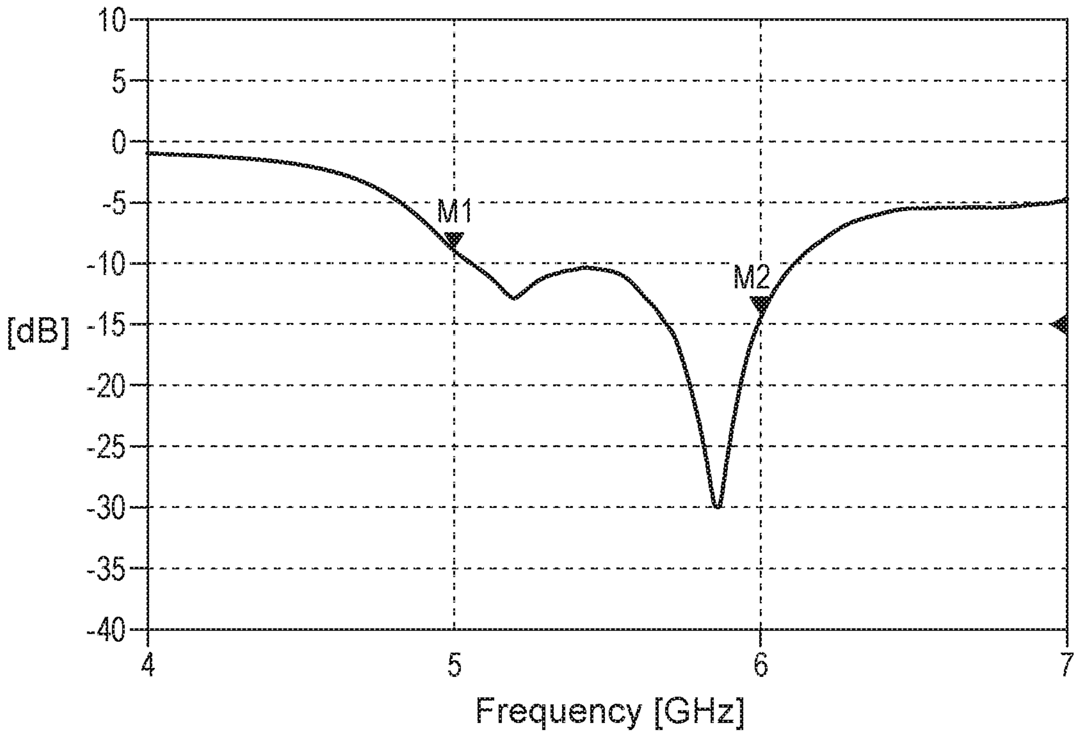
FIGS. 13*a* and 13*b* show graphs representing the measured magnitude of the input reflection coefficient of an inverted-F antenna and the antenna.
Figure 13B:
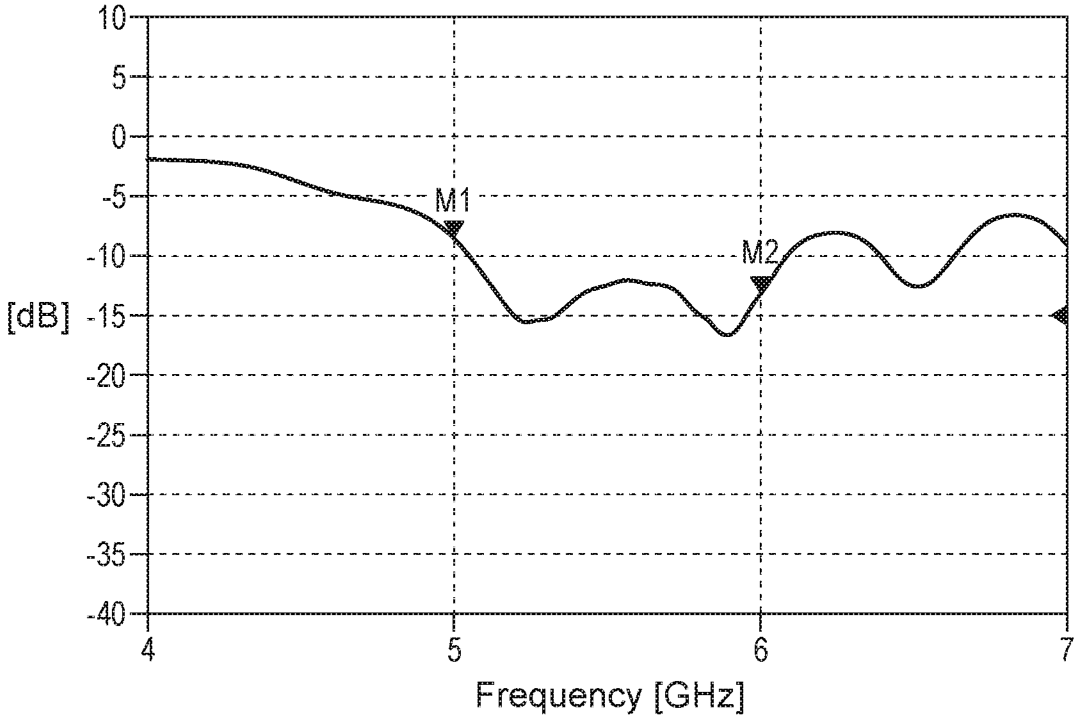
Figure 13C:
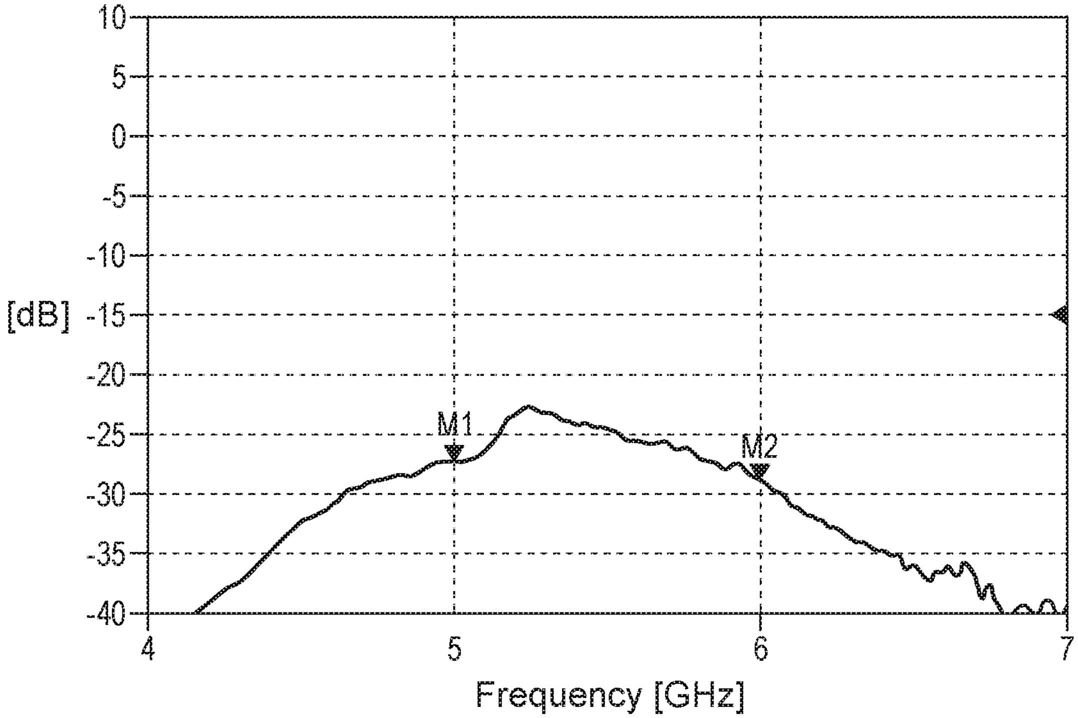
FIGS. 13*c* and 13*d* show graphs representing the measured coupling of an inverted-F antenna and the antenna.
Figure 13D:
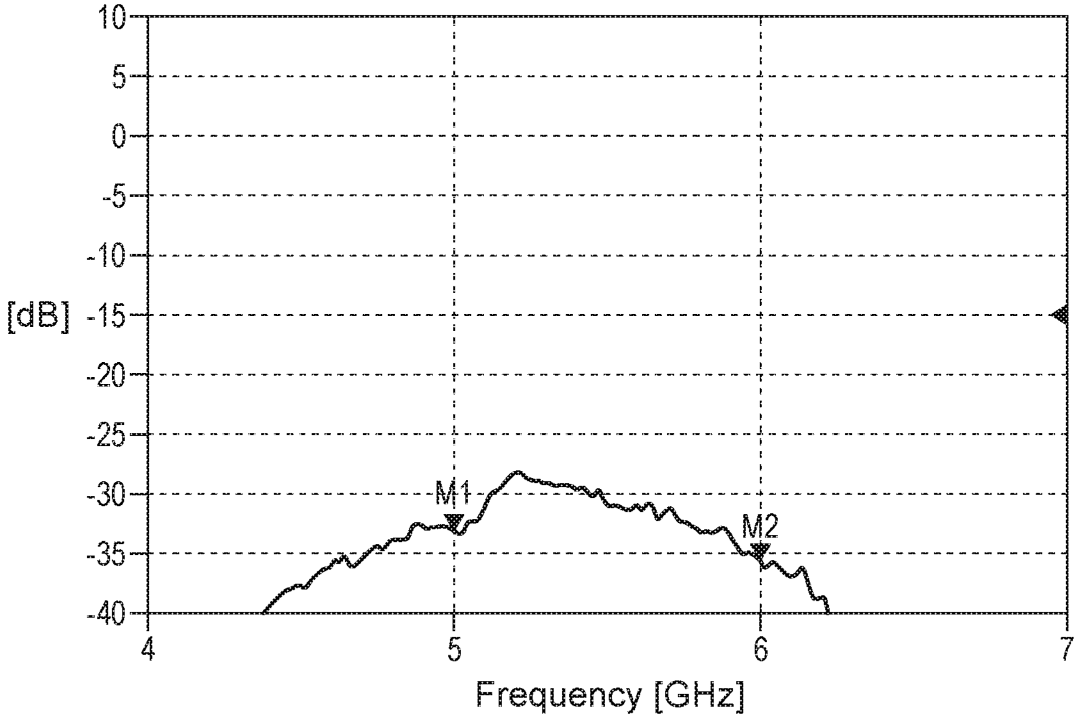

FIGS. 13*a* and 13*b* show graphs of the measured magnitude of the input reflection coefficient of an inverted-F antenna and the antenna according to the invention. FIGS. 13*a* and 13*b* show the measured magnitude of the input reflection coefficient of the inverted-F antenna (117) and of the antenna (101) according to the invention as shown in FIG. 12. FIGS. 13*c* and 13*d* show a graph of the measured coupling of an inverted-F antenna and an antenna according to the invention. FIG. 13*c* shows the measured coupling of an inverted-F antenna (117) positioned at 2.0 cm from the antenna (101) as shown in FIG. 12. FIG. 13*d* shows the measured coupling of an inverted-F antenna (117) positioned at 4.0 cm from the antenna (101) as shown in FIG. 12.

Figure 14:
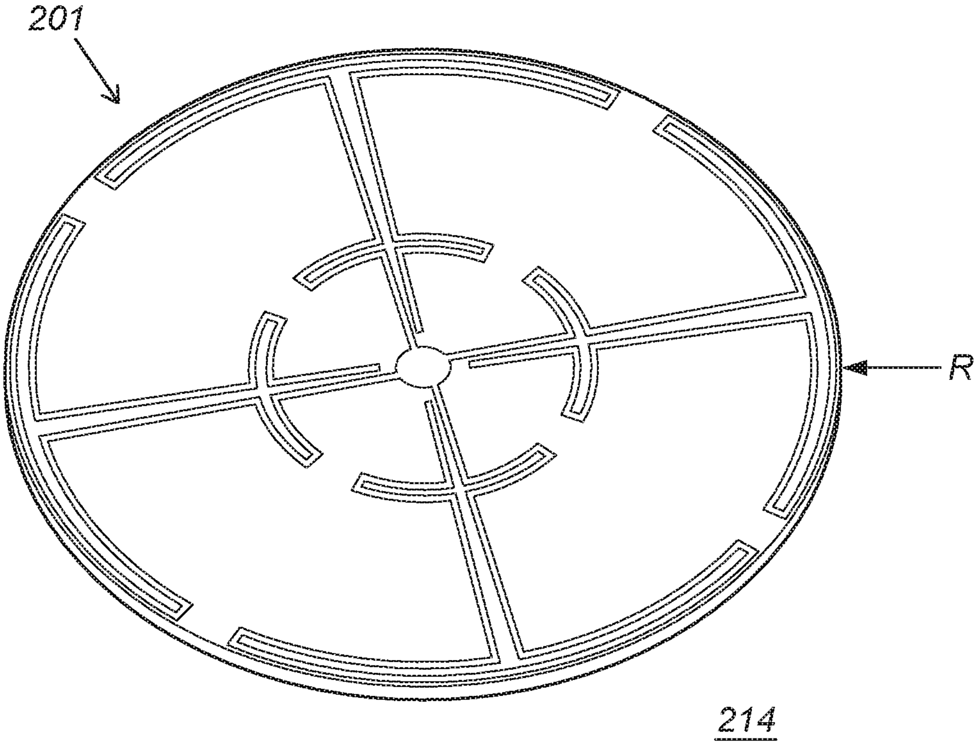
FIG. 14 shows a schematic representation of a simulation model of a miniaturized antenna.
Figure 15:
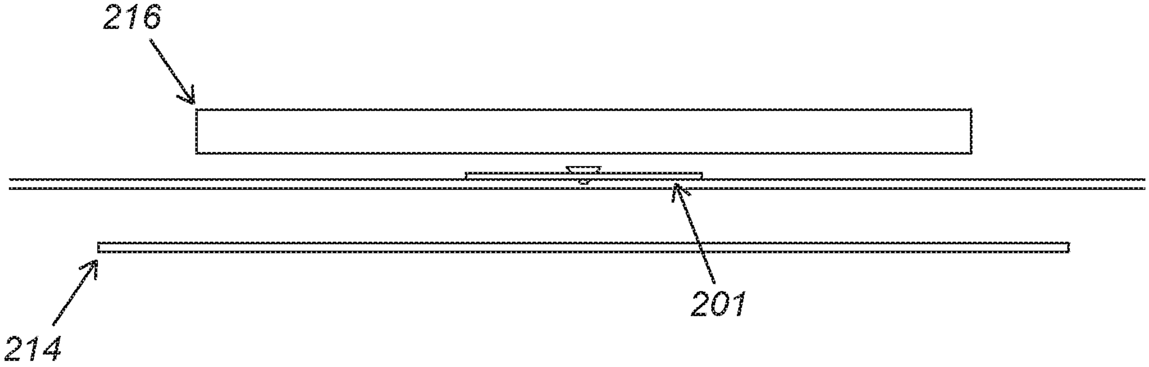
FIG. 15 shows an exploded side view of the representation of FIG. 14.

FIGS. 14-18*b* are related to the same embodiment of a horizontal omnidirectional antenna according to the present invention. FIG. 14 shows a schematic representation of a simulation model of a miniaturized antenna (201) according to the present invention. The radius R of such antenna (201) is 1.24 cm and is positioned 7.7 mm above a ground plane (214). FIG. 15 shows an exploded side view of the representation as shown in FIG. 14. Above the antenna (201) is a radome (216) ($\varepsilon r=3$, tan (d)=0.005) positioned at 2 mm distance. The radome (216) is an enclosure configured to protects the antenna (201), such as the plastic housing of router, gateway, or access point. As radome (216) any dielectric structure, in particular an either flat and/or curved—dielectric plate may be used, which covers and therefore protects the antenna (201) and preferably minimally attenuates the electromagnetic signal transmitted or received by the antenna (201). Suitable dielectric materials for the radome (216) are, for example, polymers, in particular polymethylmethacrylaat (PMMA). PMMA is a relatively lightweight polymer and has a relatively good radiation transmittance. As shown in FIG. 15, the radome (216) is positioned on top of the antenna (201), wherein the radome (216) is typically attached to an upper surface of the substrate and/or the dipole elements. This radome (216) is also referred to as an upper radome (216). It is also conceivable though, that the radome (216) is positioned underneath the antenna (201), wherein the radome is typically attached to at least a lower surface of the substrate (not shown in FIG. 15). This radome is also referred to as lower radome (216). It is imaginable that both an upper radome and a lower radome are applied to cover (at least partially) both the upper side and the lower side of the antenna.

Figure 16:
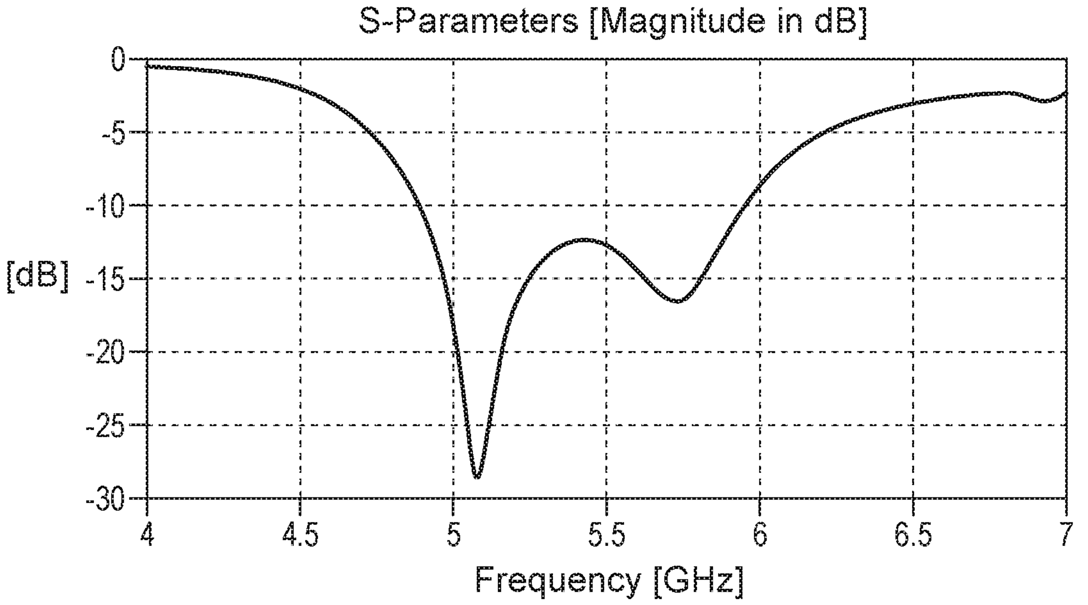
FIG. 16 shows a graph representing the simulated magnitude of the input reflection coefficient of the miniaturized antenna of FIGS. 14 and 15.
Figure 17:
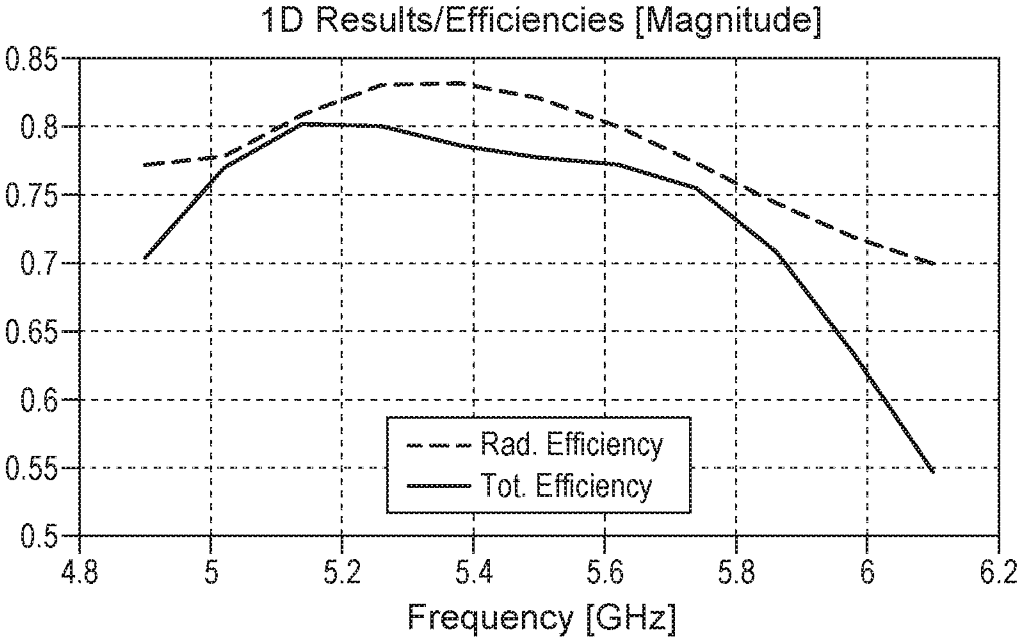
FIG. 17 shows a graph representing the simulated antenna efficiency corresponding to the simulation model.
Figure 18A:
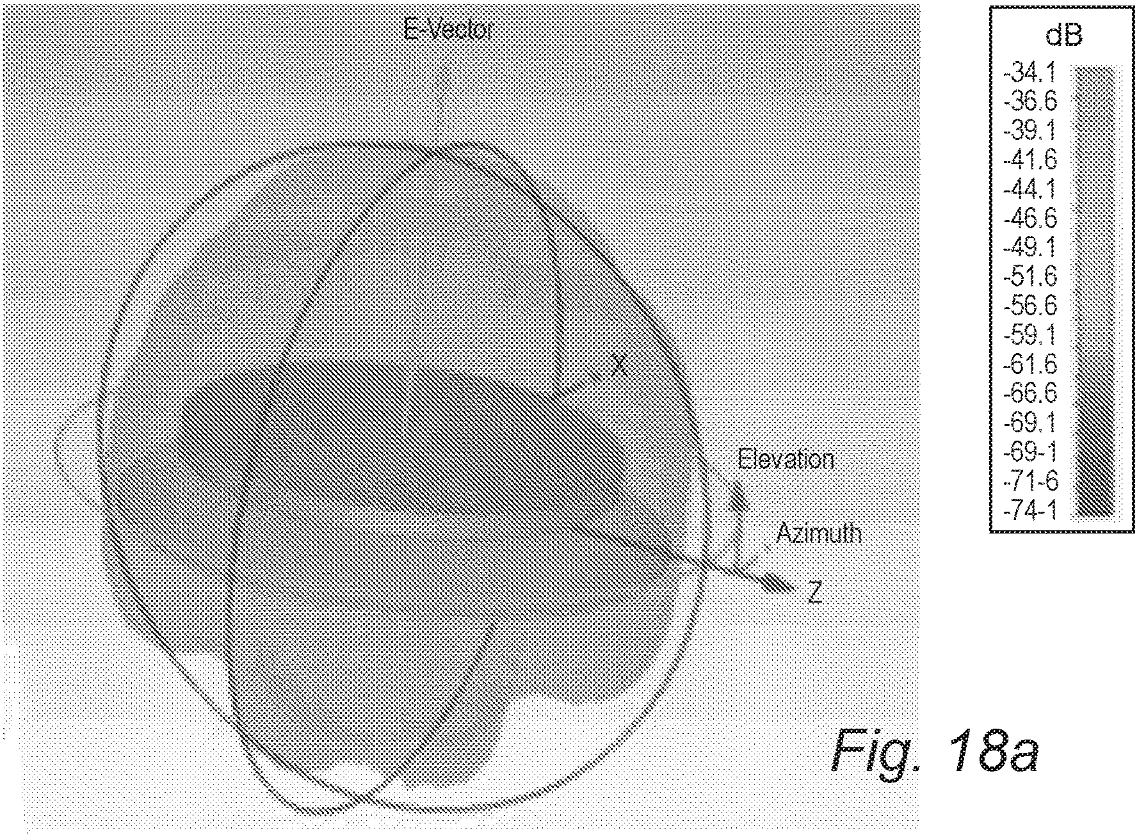
FIGS. 18*a* shows simulated radiation solids of the miniaturized antenna of FIGS. 14 and 15 at 5.5 GHz, particularly showing the vertically polarized component of the antenna realized gain.
Figure 18B:
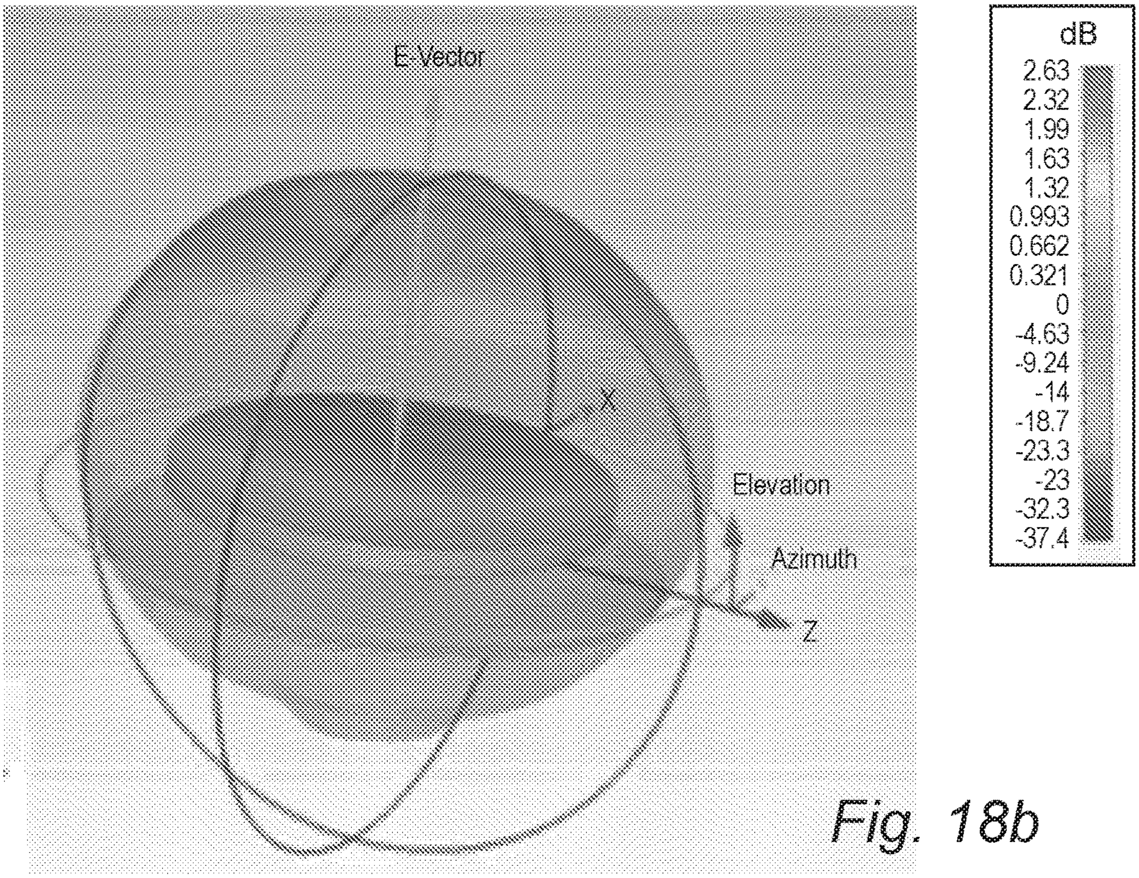
FIGS. 18*b* shows simulated radiation solids of the miniaturized antenna of FIGS. 14 and 15 at 5.5 GHz, particularly showing the horizontally polarized component of the antenna realized gain.

FIG. 16 shows a graph of the simulated magnitude of the input reflection coefficient of the miniaturized antenna (201) of FIGS. 14 and 15. FIG. 17 show a graph of the simulated antenna efficiency corresponding to the simulation model. Both the radiation efficiency and the total efficiency are shown. FIGS. 18*a* and 18*b* show simulated radiation solids of said antenna at 5.5 GHz, wherein FIG. 18*a* shows the vertically polarized component of the antenna realized gain and FIG. 18*b* the horizontally polarized component of the antenna realized gain.

Figure 19A:
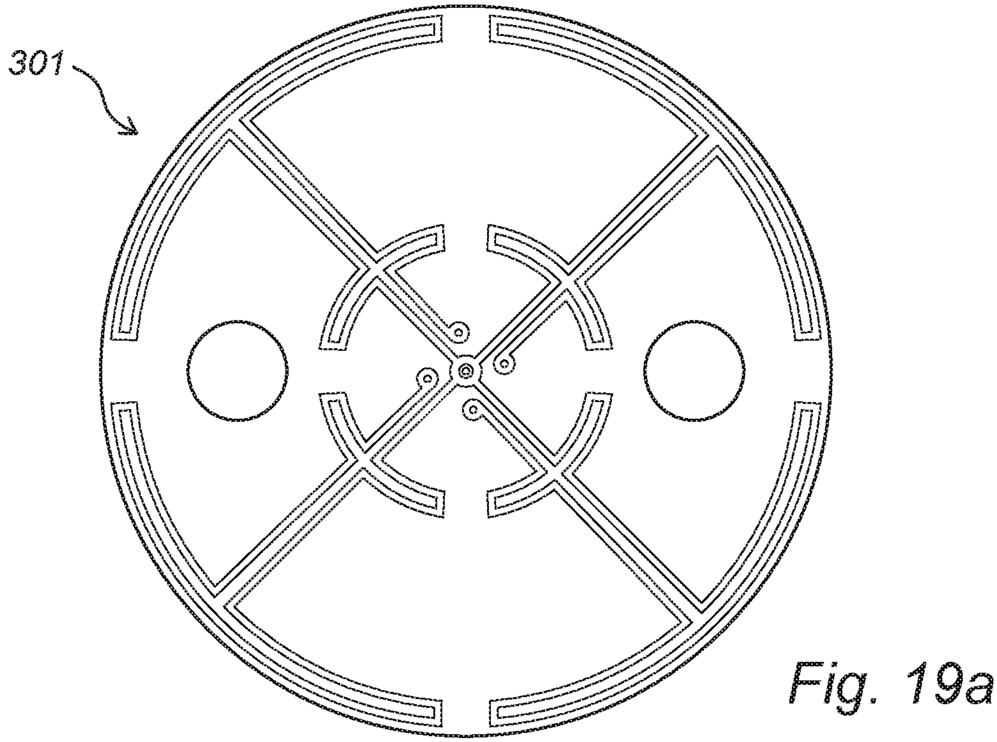
FIG. 19*a* shows a top view of a manufactured miniaturized antenna equivalent to the simulation model of FIG. 14.
Figure 19B:
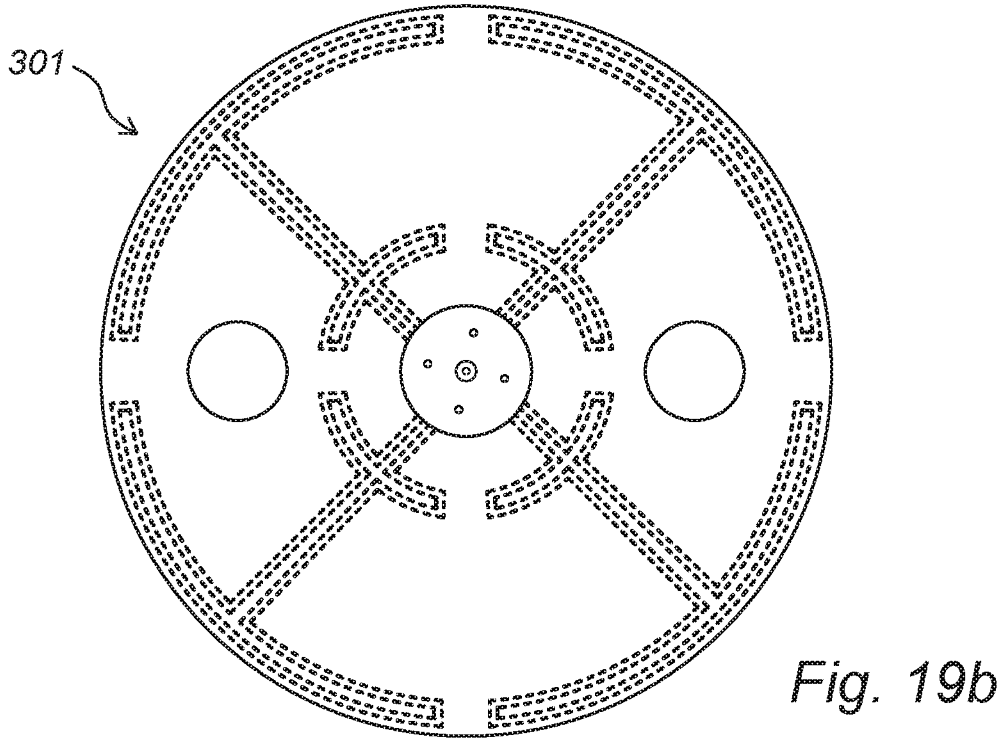
FIGS. 19*b* shows a bottom view of a manufactured miniaturized antenna equivalent to the simulation model of FIG. 14.
Figure 20:
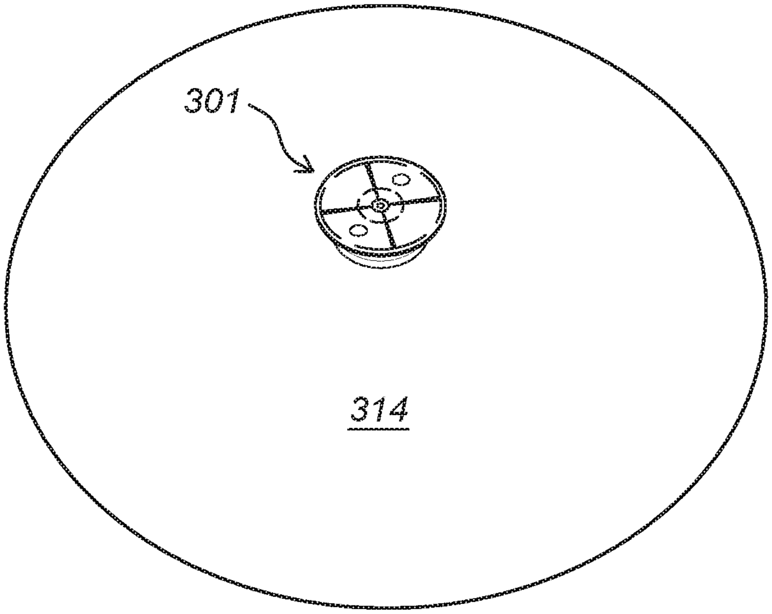
FIG. 20 shows a perspective view of the antenna of FIGS. 19*a* and 19*b* positioned 7.7 mm above a ground plane.
Figure 21:
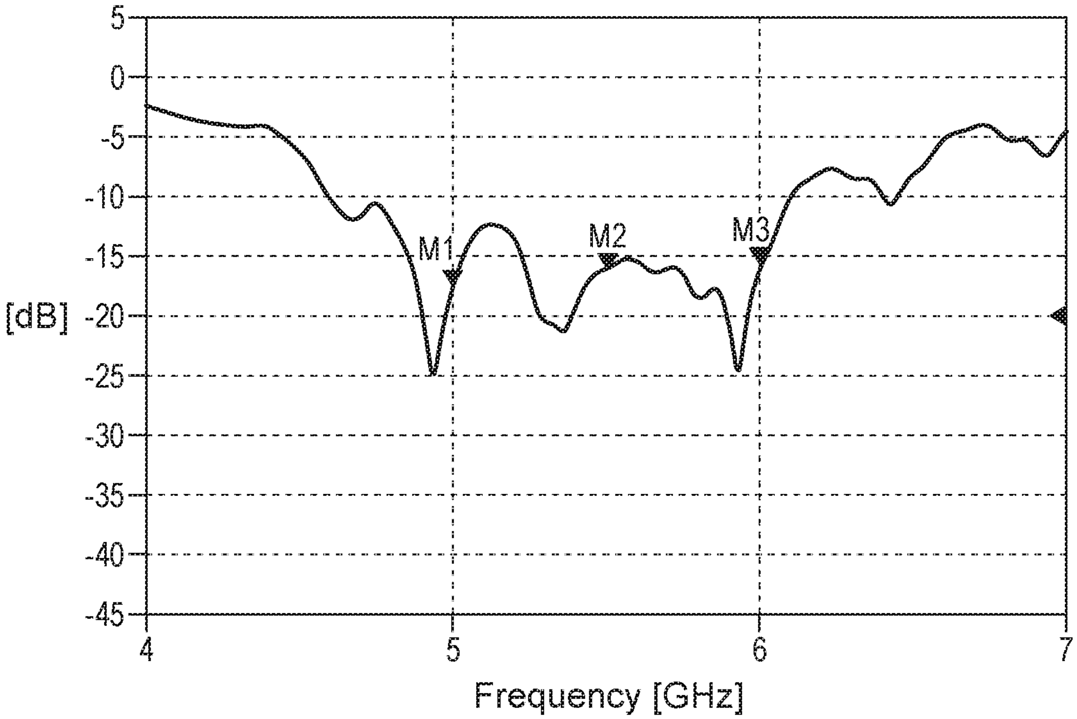
FIG. 21 is a graph showing the measured magnitude of the input reflection coefficient of the miniaturized antenna of FIGS. 19*a*, 19*b* and 20 in combination with a radome.
Figure 22:
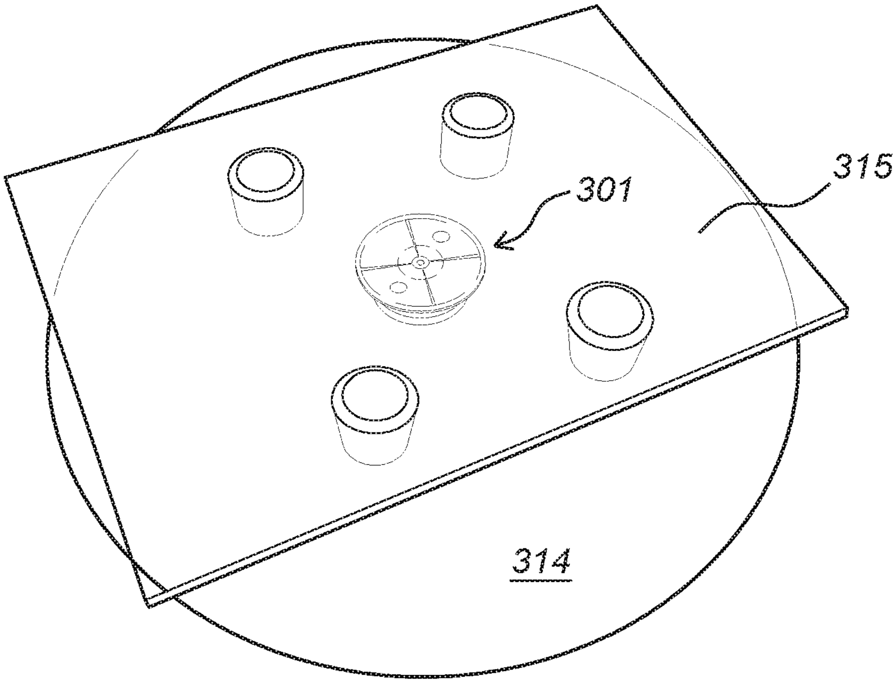
FIG. 22 shows a set-up used for the efficiency measurement of miniaturized antenna of FIGS. 19*a*, 19*b* and 20.
Figure 23:
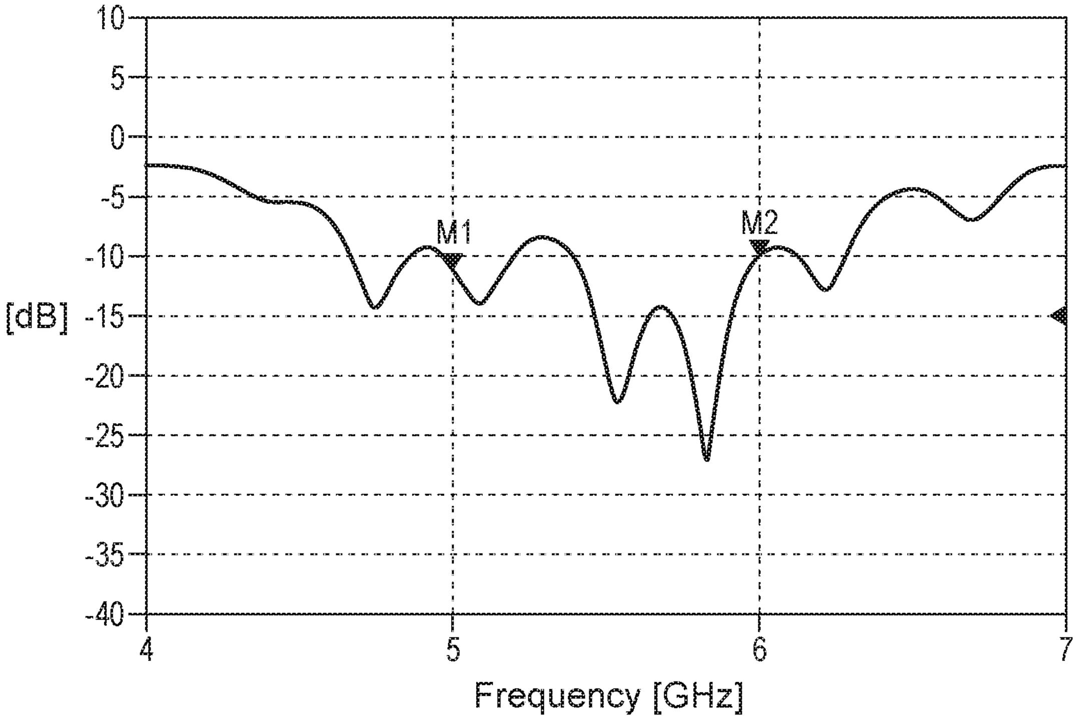
FIG. 23 is a graph showing the results of the efficiency measurement of miniaturized antenna of FIGS. 19*a*, 19*b* and 20.
Figure 24:
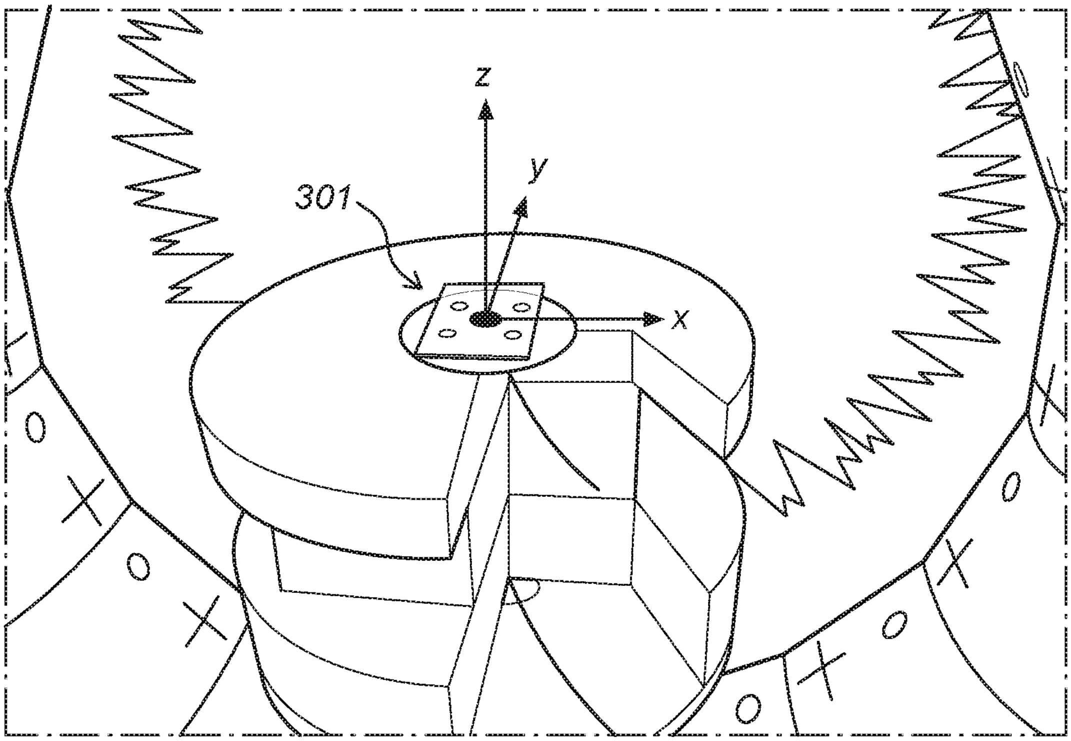
FIG. 24 shows a partial perspective view of a further set-up of the antenna of FIG. 22 in combination with a StarLab near-field scanner.
Figure 25:
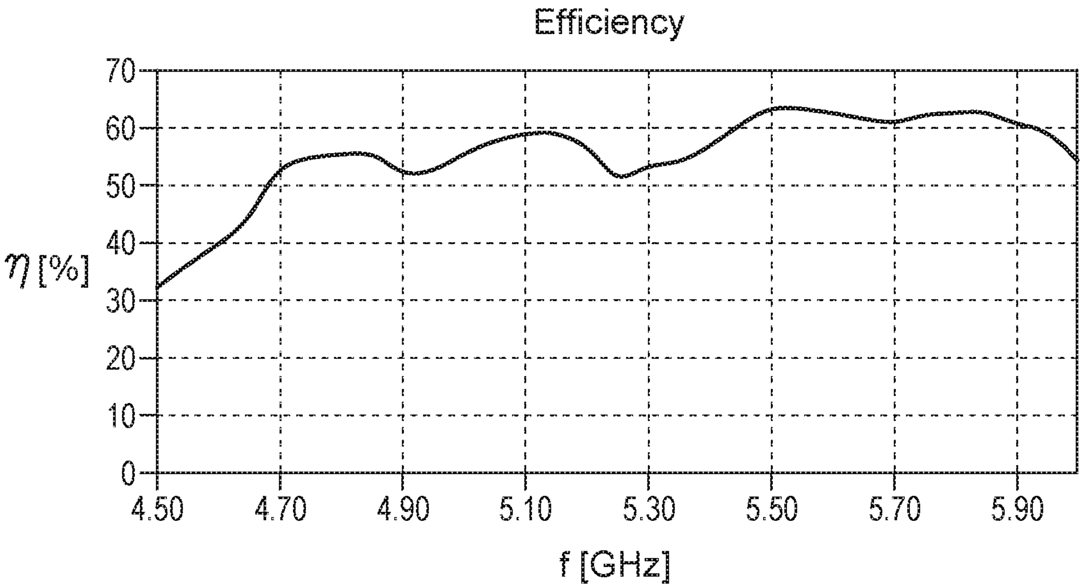
FIG. 25 shows a graph representing the measured antenna efficiency corresponding to the simulation model.
Figure 26:
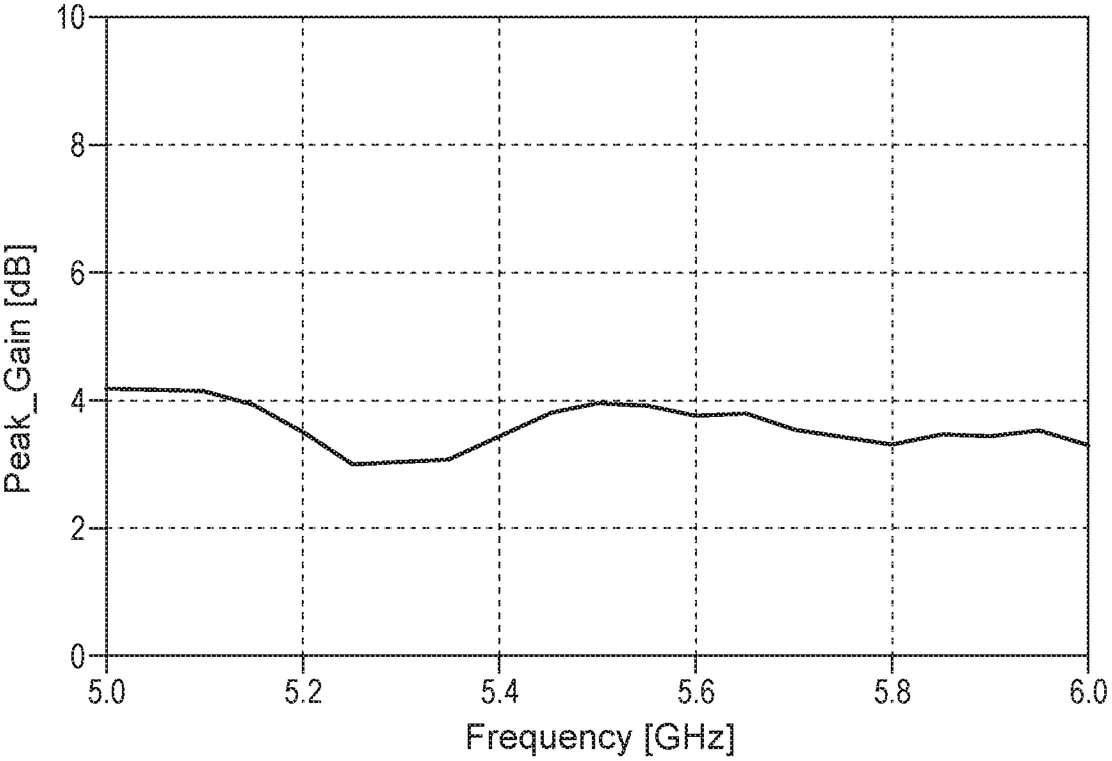
FIG. 26 shows a graph representing the measured antenna realized gain for the antenna of FIGS. 19*a*-24.
Figure 27A:
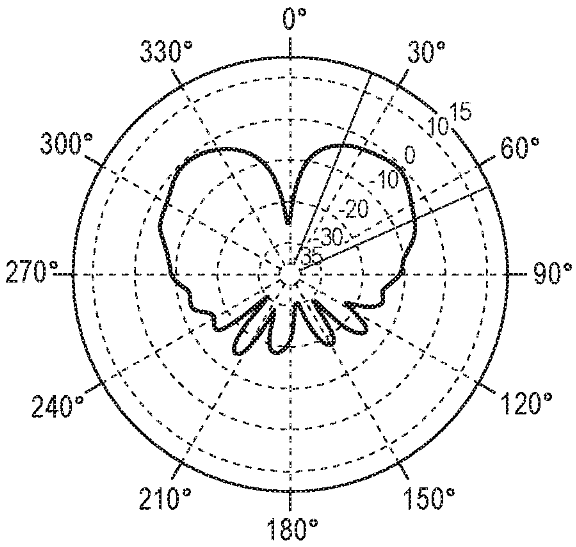
FIGS. 27*a*, 27*b* and 27*c* show the measured horizontally polarized component of the electromagnetic field radiated at 5.5 GHz by the antenna of FIGS. 19*a*-24.
Figure 27B:
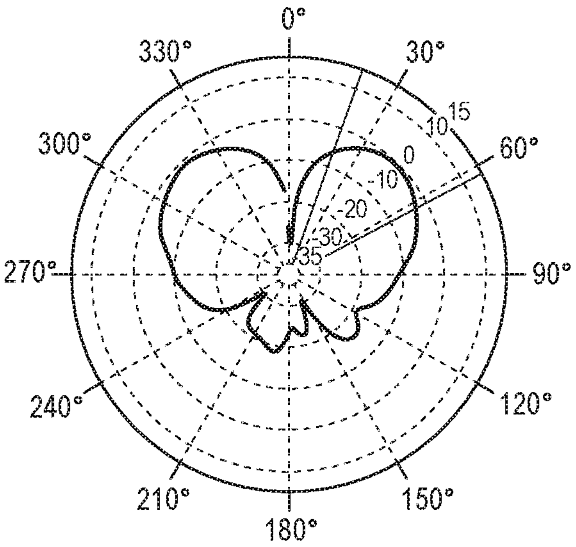
Figure 27C:
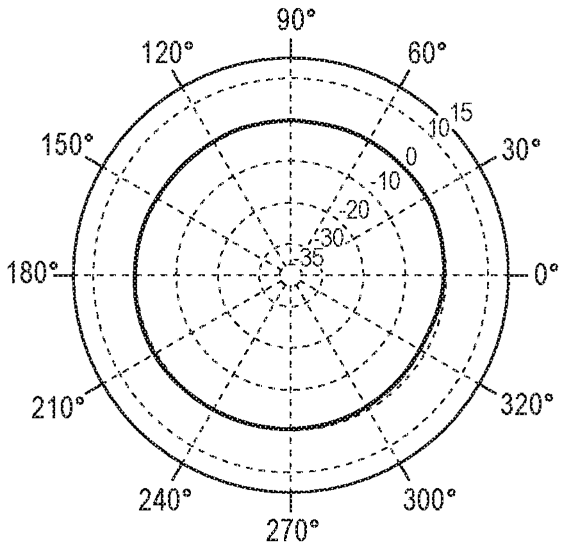
Figure 27D:
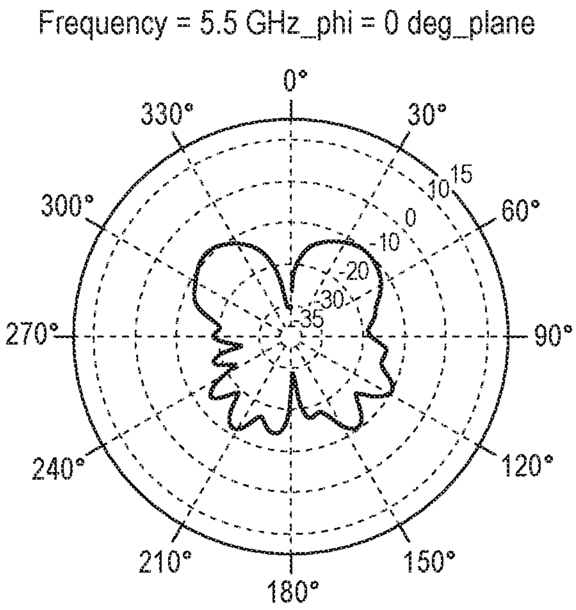
FIGS. 27*d*, 27*e* and 27*f* show the measured vertically polarized component of the electromagnetic field radiated at 5.5 GHz by the antenna of FIGS. 19*a*-24.
Figure 27E:
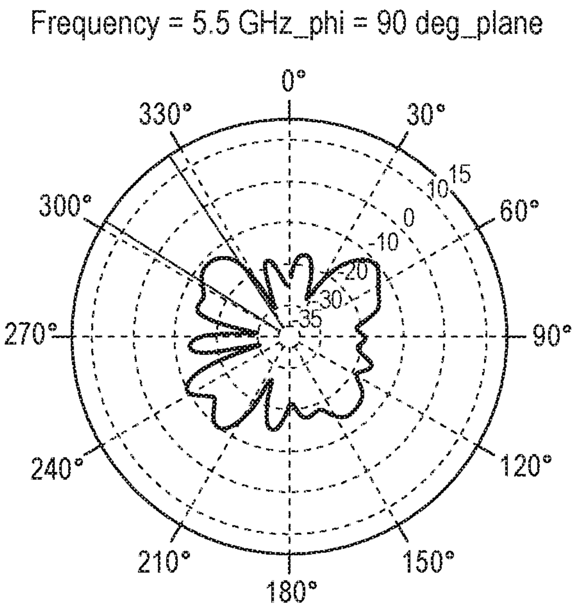
Figure 27F:
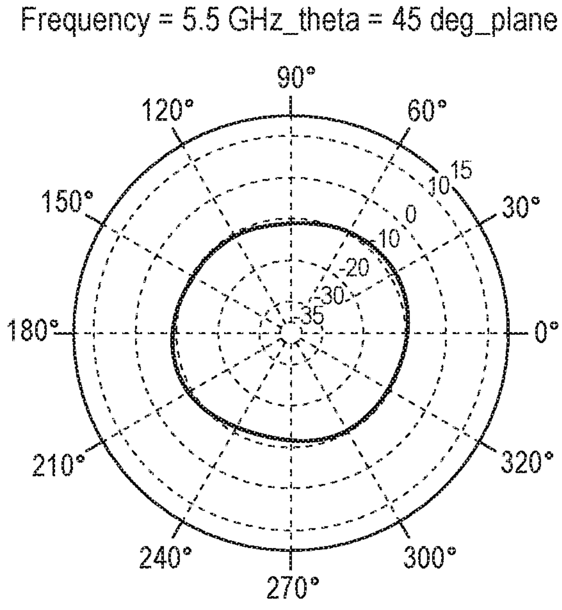

FIGS. 19*a*-27*f* are related to the same embodiment of a horizontally polarized omnidirectional antenna according to the present invention. FIGS. 19*a* and 19*b* show a top side (FIG. 18*a*) and a bottom side (FIG. 18*b*) of a manufactured miniaturized antenna (301) equivalent to the simulation model of FIG. 14. A 0.5 mm FR4-substrate is used. FIG. 20 shows the antenna (301) as shown in FIGS. 19*a* and 19*b* positioned 7.7 mm above a ground plane (314). The radius of the antenna (301) is again 1.24 cm. FIG. 21 is in line with FIG. 16, showing the measured magnitude of the input reflection coefficient of the miniaturized antenna (301) of FIGS. 19 and 20 in combination with a radome (εr=3, tan (d)=0.005). FIG. 22 shows the set-up as used for the efficiency measurement of FIG. 23. A sheet of Plexiglas (315) is placed 2 mm above the antenna (301) and emulates the radome. FIG. 24 shows a further set-up of the antenna as shown in FIG. 22 in combination with a StarLab near-field scanner as used in the radiation pattern measurement as shown in FIGS. 27*a*-27*f*. FIG. 25 shows a graph of the measured antenna efficiency corresponding to the simulation model. FIG. 26 shows a graph of the measured antenna realized gain, indicating a figure of merit which combines the antenna directivity and total efficiency, in dBi for an antenna as shown in FIGS. 19*a*-24. The x-axis shows the frequency in GHz, the y-axis shows the antenna realized gain. FIGS. 27*a*-27*f* show the measured horizontally polarized component (FIGS. 27*a*, 27*b*, 27*c*) and vertically polarized component (FIGS. 27*d*, 27*e*, 27*f*) of the electromagnetic field radiated at 5.5 GHz by an antenna according to the present invention as shown in said figures. FIGS. 27*a* and 27*d* show the xz-plane, FIGS. 27*b* and 27*e* the xy-plane and FIGS. 27*c* and 27*f* the xy-plane for an elevation angle equal to 45 degrees.

Figure 28:
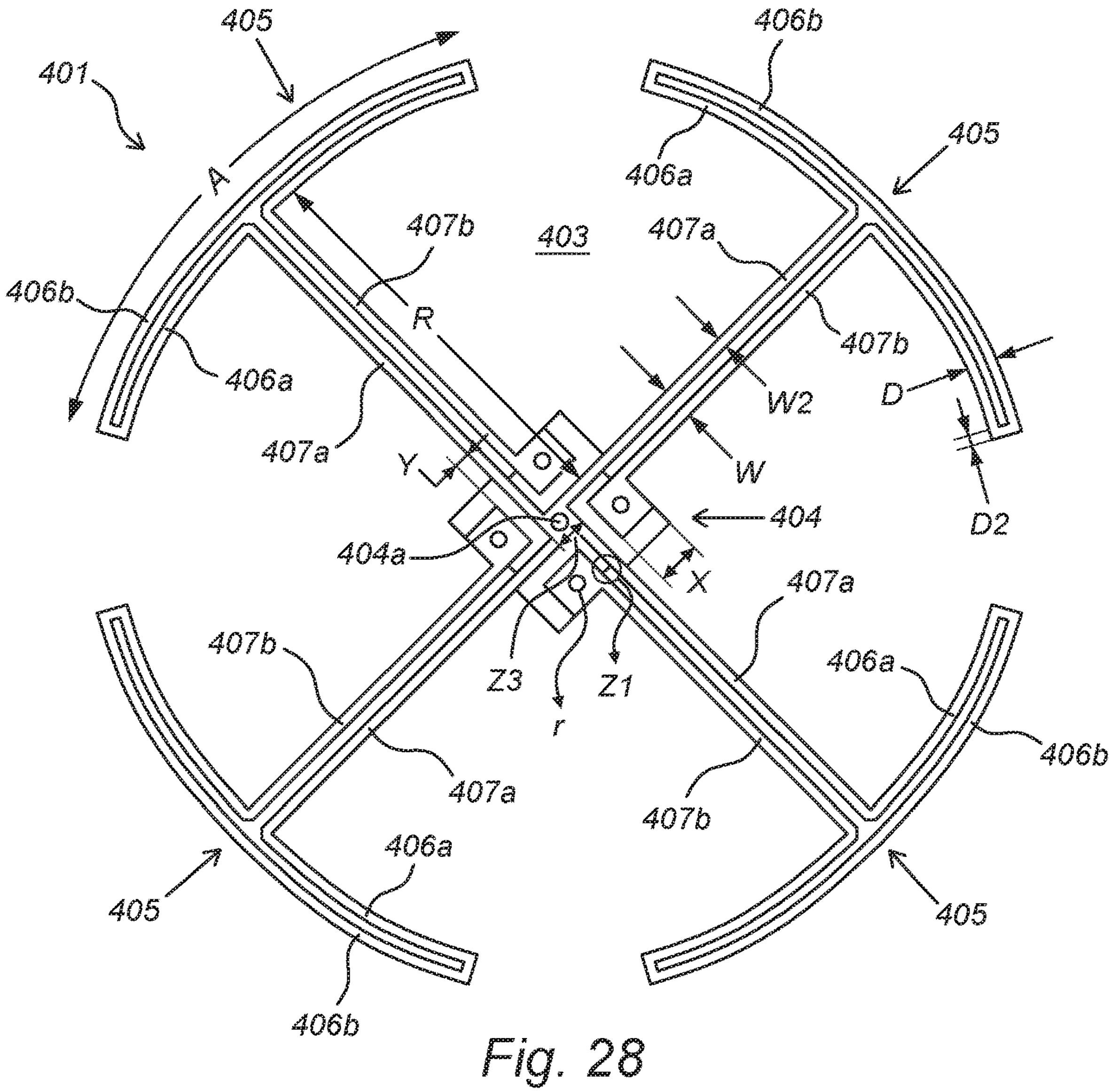
FIG. 28 schematically illustrates an alternative embodiment of the antenna.

FIG. 28 shows a possible embodiment of an antenna (401) according to the present invention. The figure shows a central feeding point (404) and first dipole branches (407*a*) being connected to an upper patch (404*a*). The second dipole branches (407*b*) are connected to a lower patch (not shown). The antenna (401) comprises a substantially flat, dielectric substrate (403), a conductive central feeding point (404) and four folded dipole elements (405) applied onto an upper side of said substrate (403). Each folded dipole element (405) comprises a loop-shaped first conductor (406) including a first inner conductor part (406*a*) and a first outer conductor part (406*b*), wherein outer ends of the first inner conductor part (406*a*) are connected to respective outer ends of the first outer conductor part (406*b*), and a first conductive dipole branch (407*a*) and a second conductive dipole branch (407*b*), both dipole branches being connected, respectively, to different segments of said first inner conductor part (406*a*), wherein both dipole branches (407*a*, 407*b*) are also connected to said central feeding point (404). The shape of each folded dipole element (405) is at least partially defined by the polar function:

$$\rho_d(\varphi) = \frac{1}{\sqrt[n_1]{\left|\frac{1}{a}\cos\frac{m_1}{4}\varphi\right|^{n_2} + / - \left|\frac{1}{b}\sin\frac{m_2}{4}\varphi\right|^{n_3}}}$$

$$a, b \in \mathbb{R}^+;\ m_1, m_2, n_1, n_2, n_3 \in \mathbb{R},\ a, b, n_1 \neq 0$$

wherein:

$\rho_d(\varphi)$ is a curve located in the XY-plane;

$\varphi \in [0, 2\pi)$ is the angular coordinate; and $m_1 \neq 0$, $m_2 \neq 0$, and wherein at least one of $n_1$, $n_2$, and $n_3$ does not equal 2.

In particular the shape of the first curved outer conductor part of the dipole elements is defined by said polar function.

Figure 29:
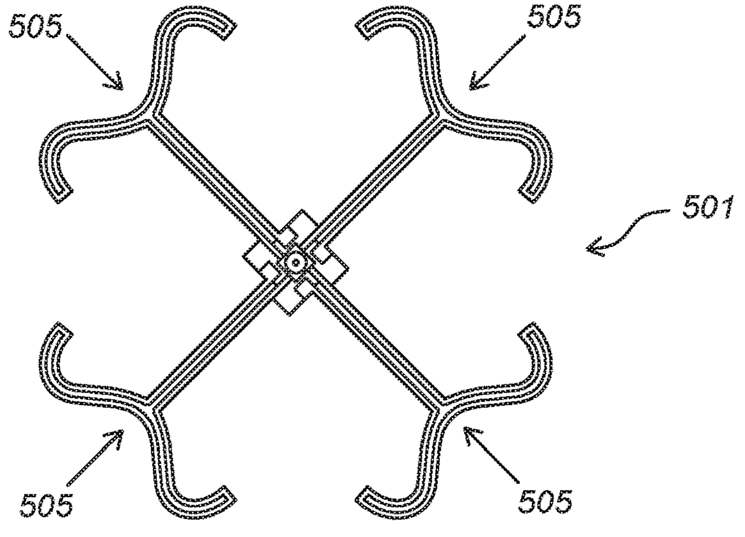
FIG. 29 schematically illustrates another alternative embodiment of the antenna.

The figure is further used to indicate possible parameters for the antennas (401, 501) of both FIGS. 28 and 29. The used parameter are shown in the table below.

| Parameters | FIG. 28 | FIG. 29 |
|---|---|---|
| m = m1 = m2 | 4 | 8 |
| n1 | 2.5 | 4 |
| n2 | 2.5 | 2.5 |
| n3 | 2.5 | 2.5 |
| R = Radius (mm) | 12.7 | 10.7 |
| A = angle spread (degrees) | 69 | 64 |
| W (mm) | 0.7 | 0.7 |
| W2 (mm) | 0.3 | 0.17 |
| D (mm) | 0.6 | 0.6 |
| D2 (mm) | 0.3 | 0.17 |
| X (mm) | 1.3 | 0.8 |
| r (mm) | 0.5 | 0.25 |
| Y (mm) | 0.5 | 0.4 |
| Z1 (mm) | 2 | 1.6 |
| Z2 (mm) | | −0.6 |
| Z3 | 1 | 1.35 |

FIG. 29 shows another possible embodiment of an antenna (501) wherein the shape of each folded dipole element (505) is defined by the polar function:

$$\rho_d(\varphi) = \frac{1}{\sqrt[n_1]{\left|\frac{1}{a}\cos\frac{m_1}{4}\varphi\right|^{n_2} + / - \left|\frac{1}{b}\sin\frac{m_2}{4}\varphi\right|^{n_3}}}$$

$$a, b \in \mathbb{R}^+;\ m_1, m_2, n_1, n_2, n_3 \in \mathbb{R},\ a, b, n_1 \neq 0$$

wherein:

$\rho_d(\varphi)$ is a curve located in the XY-plane;

$\varphi \in [0, 2\pi)$ is the angular coordinate; and $m_1 \neq 0$, $m_2 \neq 0$, and wherein at least one of $n_1$, $n_2$, and $n_3$ does not equal 2.

The further parameters of the antenna (501) can be found in the table above.

Figure 30:
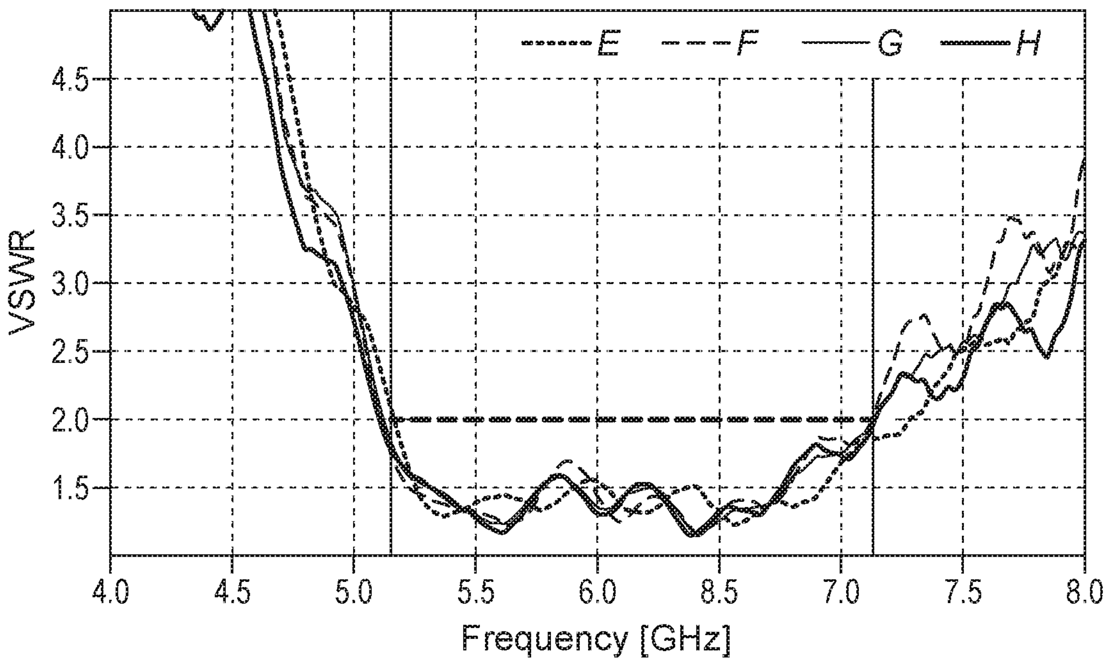
FIG. 30 is a graph showing the voltage standing wave ratio (VSWR) versus the frequency (in GHz) for the antenna of FIG. 28.
Figure 31:
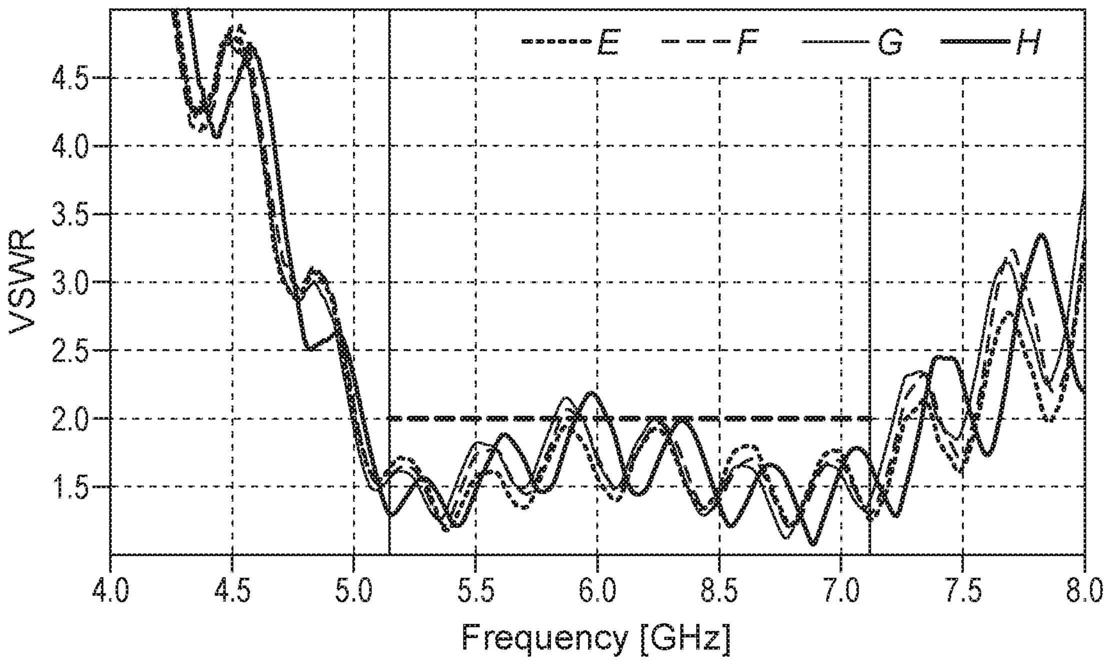
FIG. 31 is a graph showing the voltage standing wave ratio (VSWR) versus the frequency (in GHz) for the antenna of FIG. 29.

FIGS. 30 and 31 showing the voltage standing wave ratio (VSWR) versus the frequency (in GHz) for both the antennas of respectively FIGS. 28 and 29. The VSWR is a function of the reflection coefficient, which describes the power reflected from the antenna. Each graph shows the signal for 4 different antenna's (E, F, G and H). It can be seen in FIG. 30 that for the frequency range from 5.2 to 7.2 GHz all antennas (401) according to the embodiment of FIG. 28 show a good VSWR, as a value below 2 is considered sufficient. It further follows from the graph that the antennas (401) have excellent impedance matching behavior. It can be seen in FIG. 31 that the antennas (501) according to the embodiment of FIG. 29 also show rather extreme broadband behavior and a good impedance matching. Hence, the antennas (401, 501) may in particular be suitable for WiFi-6E applications.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The ordinal numbers used in this document, like "first", and "second", are used only for identification purposes. Expressions like "horizontal", and "vertical", are relative expressions with respect to a plane defined by the substrate. The verb "comprise" and conjugations thereof used in this patent publication are understood to mean not only "comprise", but are also understood to mean the phrases "contain", "substantially consist of", "formed by" and conjugations thereof.

The invention claimed is:

1. An antenna for IEEE 802.11 applications, comprising:

a flat, dielectric substrate, a conductive central feeding point, at least three folded dipole elements applied onto an upper side of said substrate, each folded dipole element comprising:

- a loop-shaped first conductor including a first curved inner conductor part and a first curved outer conductor part, wherein outer ends of the first inner conductor part are connected to respective outer ends of the first outer conductor part, and
- a first conductive dipole branch and a conductive second dipole branch, both dipole branches being connected, respectively, to different segments of said first inner conductor part, wherein both dipole branches are also connected to said central feeding point, wherein the conductors of the folded dipole elements are arranged in a circular arrangement, and wherein the antenna comprises a dielectric carrier for mounting the dielectric substrate and the folded dipole elements applied onto an upper side of said substrate onto a ground plane, wherein said dielectric carrier comprises a through hole suitable for receiving a part of a probing structure to be connected to said feeding point.

2. The antenna according to claim 1, wherein the antenna is configured to act as omnidirectional horizontal polarized antenna.

3. The antenna according to claim 1, wherein the central feeding point comprises an upper patch applied onto the upper side of the dielectric substrate, wherein the first dipole branches are connected to said upper patch, and wherein the central feeding point comprises a lower patch applied onto the lower side of the dielectric substrate, wherein the second dipole branches are connected to said lower patch.

4. The antenna according to claim 3, wherein each second dipole branch is connected to the lower patch by a conductive via enclosed by a through hole made in the substrate.

5. The antenna according to claim 3, wherein at least one patch of the upper patch and the lower patch has a circular shape.

6. Antenna according to claim 1, wherein the first dipole branch and the second dipole branch are oriented and designed such that, during use, the electromagnetic field components radiated by the opposite currents flowing through said dipole branches at least partially cancel out each other.

7. Antenna according to claim 1, wherein the first dipole branch and the second dipole branch of a folded dipole element are oriented in parallel.

8. Antenna according to claim 1, wherein the first dipole branch and the second dipole branch of a folded dipole element have an identical geometry.

9. The antenna according to claim 1, wherein, in each folded dipole element, the length of the first dipole branch exceeds the length of the second dipole branch of a folded dipole element.

10. The antenna according to claim 1, wherein, in each folded dipole element, the radius of the first inner conductor and the radius of the first outer conductor coincide with a central portion of the substrate and/or a central portion of the feeding point.

11. The antenna according to claim 1, wherein, in each folded dipole element, at least one first inner conductor is connected to the outer ends of both the first and the second dipole branch.

12. The antenna according to claim 1, wherein each of a plurality of folded dipole elements comprises at least one second loop-shaped conductor including a second curved inner conductor part and a second curved outer conductor part, wherein outer ends of the second inner conductor part are connected to respective outer ends of the second outer conductor part, wherein different segments of the second outer conductor part are connected, respectively, to facing segments of the first conductor part by the first dipole branch and the second dipole branch.

13. The antenna according to claim 12, wherein the width of the first conductor exceeds the width of the second conductor and wherein the second loop-shaped conductor is situated in between the first conductor and the central feeding point.

14. The antenna according to claim 1, wherein the folded dipole elements are axisymmetric.

15. The antenna according to claim 1, wherein the antenna comprises at least four folded dipole elements.

16. The antenna according to claim 1, wherein the antenna comprises a conductive ground plane, wherein the dielectric carrier is mounted onto said ground plane.

17. The antenna according to claim 1, wherein the antenna is configured to operate in the 5 GHz frequency band or in the 2.4 GHz frequency band.

18. The antenna according to claim 1, wherein a lower side and/or an upper side of the antenna is covered by at least one dielectric structure.

19. The antenna according to claim 1, wherein the shape of at least one folded dipole element is at least partially defined by the polar function:

$$\rho_d(\varphi) = \frac{1}{\sqrt[n_1]{\left|\frac{1}{a}\cos\frac{m_1}{4}\varphi\right|^{n_2} + / - \left|\frac{1}{b}\sin\frac{m_2}{4}\varphi\right|^{n_3}}}$$

$$a, b \in \mathbb{R}^+; m_1, m_2, n_1, n_2, n_3 \in \mathbb{R}, a, b, n_1 \neq 0$$

wherein:

$\rho_d(\varphi)$ is a curve located in the XY-plane;

$\varphi \in [0, 2\pi)$s the angular coordinate; and $m_1 \neq 0$, $m_2 \neq 0$, and wherein at least one of $n_1$, $n_2$, and $n_3$ does not equal 2.

20. A wireless communication system, comprising a plurality of antennas according to claim 1.

* * * * *